United States Patent
Giombanco et al.

(10) Patent No.: US 8,478,332 B2
(45) Date of Patent: *Jul. 2, 2013

(54) RECEIVER FOR SIGNAL COMMUNICATION SYSTEM WITH DISTURBANCE REJECTION CIRCUIT

(75) Inventors: Salvatore Giombanco, Cassaro (IT); Michele Grande, Avola (IT); Giovanni Lombardo, Alcamo (IT); Salvatore Tumminaro, Marianopoli (IT); Filippo Marino, Tremestieri Etneo (IT)

(73) Assignee: STMicroelectronics, S.R.L., Agrate Brianza (IT)

( * ) Notice: Subject to any disclaimer, the term of this patent is extended or adjusted under 35 U.S.C. 154(b) by 382 days.

This patent is subject to a terminal disclaimer.

(21) Appl. No.: 12/846,565

(22) Filed: Jul. 29, 2010

(65) Prior Publication Data

US 2011/0028104 A1 Feb. 3, 2011

(30) Foreign Application Priority Data

Jul. 31, 2009 (IT) ............... MI2009A1381
Jul. 31, 2009 (IT) ............... MI2009A1382

(51) Int. Cl.
*H04M 1/00* (2006.01)

(52) U.S. Cl.
USPC .... 455/550.1; 455/88; 455/252.2; 455/562.1; 307/104

(58) Field of Classification Search
USPC ............... 455/550.1, 88, 252.1, 562.1, 575.7, 455/90.3, 274, 278.1; 307/104; 336/200; 361/111, 106, 804

See application file for complete search history.

(56) References Cited

U.S. PATENT DOCUMENTS

| | | | |
|---|---|---|---|
| 4,833,418 A | | 5/1989 | Quintus et al. |
| 5,389,778 A | | 2/1995 | Shinomiya |
| 5,568,561 A | | 10/1996 | Whitlock |
| 5,952,849 A | | 9/1999 | Haigh |
| 6,226,331 B1 | * | 5/2001 | Gambuzza ............... 375/258 |
| 6,937,454 B2 | * | 8/2005 | Mikolajczak et al. ...... 361/111 |
| 7,139,528 B2 | * | 11/2006 | Gambuzza ............... 455/41.2 |
| 7,288,940 B2 | * | 10/2007 | Wynne et al. ........... 324/415 |
| 7,741,943 B2 | * | 6/2010 | Fouquet et al. ........... 336/200 |
| 7,791,900 B2 | * | 9/2010 | Fouquet et al. ........... 361/803 |
| 7,796,684 B2 | * | 9/2010 | Trott ..................... 375/219 |
| 8,129,969 B1 | | 3/2012 | Chui et al. |
| 2003/0208711 A1 | | 11/2003 | Frame et al. |
| 2004/0155720 A1 | | 8/2004 | Yasui et al. |
| 2005/0110700 A1 | | 5/2005 | Terry |
| 2006/0153495 A1 | * | 7/2006 | Wynne et al. ........... 385/22 |

(Continued)

FOREIGN PATENT DOCUMENTS

| EP | 1 087 333 A2 | 3/2001 |
|---|---|---|
| EP | 1087333 A2 | 3/2001 |

(Continued)

*Primary Examiner* — Minh D Dao
(74) *Attorney, Agent, or Firm* — Seed IP Law Group PLLC

(57) ABSTRACT

A receiver of a signal communication apparatus; the apparatus having a transmitter for transmitting the signals, the receiver for receiving the signals and a galvanically isolated wireless interface interposed between the transmitter and the receiver and having a transmitting antenna and a receiving antenna. The receiver including a disturbance rejection circuit coupled to the receiving antenna and capable of compensating for the parasite currents flowing between the transmitting antenna and the receiving antenna at the potential variations between the input and output of the galvanic isolation interface.

39 Claims, 16 Drawing Sheets

U.S. PATENT DOCUMENTS

| | | | |
|---|---|---|---|
| 2008/0061631 A1* | 3/2008 | Fouquet et al. | 307/109 |
| 2008/0069249 A1 | 3/2008 | Florence | |
| 2008/0179963 A1* | 7/2008 | Fouquet et al. | 307/104 |
| 2008/0198904 A1* | 8/2008 | Chang | 375/146 |
| 2008/0278275 A1* | 11/2008 | Fouquet et al. | 336/84 M |
| 2008/0311862 A1 | 12/2008 | Spina et al. | |
| 2008/0317106 A1* | 12/2008 | Leung et al. | 375/220 |
| 2009/0028279 A1 | 1/2009 | Kitta | |
| 2009/0150707 A1 | 6/2009 | Drucker et al. | |
| 2009/0153283 A1* | 6/2009 | Fouquet et al. | 336/200 |
| 2009/0206960 A1* | 8/2009 | Ng et al. | 333/247 |
| 2009/0213914 A1* | 8/2009 | Dong et al. | 375/219 |
| 2010/0020448 A1* | 1/2010 | Ng et al. | 361/1 |
| 2010/0052826 A1* | 3/2010 | Callahan et al. | 333/24 R |
| 2010/0148911 A1* | 6/2010 | Fouquet et al. | 336/200 |
| 2010/0176660 A1* | 7/2010 | Fouquet et al. | 307/109 |
| 2010/0329363 A1* | 12/2010 | Ng et al. | 375/257 |
| 2011/0080323 A1* | 4/2011 | Thiam et al. | 343/700 MS |
| 2011/0095620 A1* | 4/2011 | Fouquet et al. | 307/104 |

FOREIGN PATENT DOCUMENTS

| | | |
|---|---|---|
| WO | 03/009551 A2 | 1/2003 |
| WO | 03009551 A2 | 1/2003 |
| WO | 2004/042543 A1 | 5/2004 |
| WO | 2004042543 A1 | 5/2004 |
| WO | 2005/122423 A2 | 12/2005 |

* cited by examiner

RECEIVER FOR SIGNAL COMMUNICATION SYSTEM WITH DISTURBANCE REJECTION CIRCUIT

BACKGROUND

1. Technical Field

The present disclosure relates to a receiver for a signal communication system with a disturbance rejection circuit, and related methods and products.

2. Description of the Related Art

It is known the presence of galvanic isolation in applications in which the communication between circuits operating at high supply voltages (even hundreds of volts) and circuits rather operating at low supply voltages is employed; the galvanic isolation ensures the safety of the user coming in contact with the low voltage interface. The applications employing such isolation techniques are typically those regarding the power suppliers directly bonded to the power network, but also the industrial applications in which driving high voltage loads are employed.

A typical example are the "high side switch drivers" in which driving switches feeding inductive loads by means of high voltages are employed. In such a case the potential differences that may dynamically develop between the low voltage part and the high voltage part may also reach the thousands of volts per microsecond.

Several apparatus for achieving the galvanic isolation presently exist.

One of these involves using an integrated transformer. The latter is made of a pile structure in which the secondary winding generally is the metal layer arranged at the lowermost level, the primary winding is the metal layer arranged at the uppermost level and the isolation between the two windings comprises several layers of dielectric arranged between the two metal layers the thickness of which depends on the desired isolation level. Alternatively, the secondary winding may be made of the metal layer arranged at the uppermost level, the dielectric layer is inserted thereon and the primary winding is made of an additional metal layer. The isolation transformer is made on the die of the receiver. The die driver contains the transmitter that, through the bonding, is bonded to the primary of the isolation transformer. The secondary of the transformer is bonded to the receiver that processes the transmitted signal. The data flow may also occur from the secondary to the primary, in case of constructing a two-way channel. In order to transfer information through the isolated interface, the signals may be conveniently processed by a modulation technique. This type of component permits to obtain a high bit rate, good reliability and isolation capacity. This configuration employs, however, the addition of processing steps to construct the transformer (e.g., for increasing the thickness of the isolating layer in order to achieve the suitable isolation rate), as well as the use of bonding wires for bonding the transmitter of the die driver to the transformer itself.

Another galvanic isolation apparatus comprises a structure based on a transmission of the wireless type and it is described in US patent publication number 2008/0311862. The two chips are assembled one on top of the other and the isolation is achieved through an interposed isolating layer. The electromagnetic coupling is obtained through a couple of turns, particularly by means of the magnetic field produced by the power flowing on the transmitting turn. The thickness of the upper chip (e.g., the chip of the transmitter) is decreased, by lapping, to maximize the coupling between the two turns. In order to transfer information through the isolated interface, the signal may be conveniently processed by a modulation technique. This configuration has the advantage of not having additional processing steps as well as bonding wires between the two chips. It has however the disadvantage of a low coupling coefficient and its high variability, depending on the thickness tolerance after the die lapping, the tolerance of isolating layer thickness and the tolerance of the alignment between the two chips.

A further galvanic isolation apparatus comprises a structure based on a transmission of the wireless type and it is still described in US patent publication number 2008/0311862. The two chips, in this case, are assembled side-by-side and the isolation is made through an isolating layer placed under the two chips. The electromagnetic coupling is achieved through a couple of turns, particularly by means of the magnetic field produced by the power flowing on the transmitting turn. In order to transfer information through the isolated interface, the signals may be conveniently processed by a modulation technique. This configuration also has the advantage of not having additional processing steps as well as bonding wires between the two chips. It has however the disadvantage of a coupling coefficient which is lower than the previous structure and highly variable according to the tolerance of the alignment between the two chips and the tolerance of the distance between the two chips.

BRIEF SUMMARY

In an embodiment, a receiver for a signal communication system has a disturbance rejection circuit allowing the receiver to be more noise-immune.

There is described a receiver of a signal communication apparatus; the apparatus comprising a transmitter for transmitting the signals, the receiver for receiving the signals and a galvanically isolated wireless interface interposed between the transmitter and the receiver and comprising a transmitting antenna and a receiving antenna. The receiver comprises a disturbance rejection circuit coupled to the receiving antenna and capable of compensating for the parasite currents flowing between the transmitting antenna and the receiving antenna at the potential variations between the input and output of the galvanic isolation interface.

In an embodiment, a signal communication apparatus comprises a transmitter for transmitting signals, a receiver for receiving the signals and a galvanically isolated wireless interface interposed between the transmitter and the receiver and comprising a transmitting antenna and a receiving antenna, characterized in that it comprises a disturbance rejection circuit coupled to the receiving antenna and capable of compensating for the parasite currents flowing between the transmitting antenna and the receiving antenna at the potential variations between the input and output of the galvanic isolation interface. In an embodiment, said circuit comprises the series of two resistors arranged between the terminals of said receiving antenna and means adapted to adjust the voltage between the common terminal of said resistors and the ground with a reference voltage. In an embodiment, said means comprise a differential stage having at the input said voltage between the common terminal of said resistors and the ground and said reference voltage, and being adapted to drive an transistor output stage capable of modifying said voltage between the common terminal of said resistors and the ground. In an embodiment, said means comprise a differential stage having at the input said voltage between the common terminal of said resistors and the ground and said reference voltage, and being adapted to drive two transistor output stages capable of modifying the voltage at the ends of the series of said two resistors. In an embodiment, the receiver comprises an amplifier of the received signal, said amplifier being a wideband-voltage differential amplifier with a cut-off frequency substantially equal to double the band-centre frequency of the received signal, said amplifier comprising capacitive means adapted to filter the direct current component of the output signal at the amplifier and keep it at the value to allow the correct polarization of the circuit downstream of the amplifier. In an embodiment, the receiver comprises an amplifier of the received signal, said amplifier comprising a fast comparator fed back with an error amplifier adapted to reset the offset of the received signal, said error amplifier being adapted to compare the output signal to the fast comparator with a further reference signal and keep the direct current component of the output signal of the amplifier at a value to polarize the circuit downstream of the amplifier. In an embodiment, the receiver comprises a transimpedance stage having the inputs bonded to the terminals of the receiving antenna and in that said disturbance rejection circuit comprises first means adapted to take up the parasite currents present on the terminals of the receiving antenna and second means adapted to modify the polarization of the transimpedance stage in order to balance the effect of the parasite currents present on the terminals of the receiving antenna. In an embodiment, said first means comprise two circuit branches comprising a series of a PMOS transistor and an NMOS transistor bonded between the supply voltage and the ground and having the drain terminal in common, the PMOS transistors being driven by a reference voltage and the gate and drain terminals of the NMOS transistors being coupled to the terminals of the receiving antenna. In an embodiment, said transimpedance stage comprises two MOS transistors having the gate terminal in common and the source terminals bonded to the ends of the receiving antenna, said second means comprising two MOS transistors having the gate and drain terminals in common and the source terminals bonded to the ends of the receiving antenna, the gate terminals of the transistors of the second means and the transistors of the transimpedance stage being in common and bonded to a polarization current generator. In an embodiment, said transimpedance stage comprises two MOS transistors having the gate terminal in common and the source terminals bonded to the ends of the receiving antenna, said second means comprising the series of two resistors coupled to the terminals of the receiving antenna and the series of first and second MOS transistor each having the respective gate and drain terminals in common, the source terminal of the first MOS transistor having the gate terminal bonded to the common terminal of said two resistors and to the source terminal of the second transistor, the drain terminal of the second transistor of the second means being in common with the gate terminals of the transistors of the transimpedance stage and bonded to a polarization current generator.

In an embodiment, a receiver comprises: a disturbance rejection block configured to receive signals from a receiving antenna of a galvanically isolated wireless interface and to compensate for parasitic currents flowing between a transmitting antenna and the receiving antenna at potential variations between an input and an output of the galvanically isolated wireless interface; and an output block. In an embodiment, the disturbance rejection block comprises: a series of resistors configured to couple between the terminals of said receiving antenna; and a common-mode voltage generator configured to adjust a voltage between an intermediate terminal of said resistors and a ground based on a reference voltage. In an embodiment, the common-mode voltage generator comprises: a transistor output stage configured to modify the voltage between the intermediate terminal of the resistors and the ground; and a differential stage configured to receive said voltage between the intermediate terminal of said resistors and the ground and said reference voltage, and to drive the transistor output stage. In an embodiment, the common-mode voltage generator comprises: two transistor output stages configured to modify voltages at respective ends of the series of resistors; and a differential stage configured to receive said voltage between the intermediate terminal of said resistors and the ground, and said reference voltage, and to drive the two transistor output stages. In an embodiment, the receiver further comprises: a wideband-voltage differential amplifier configured to amplify a received signal and having a cut-off frequency substantially equal to double a band-center frequency of a received signal, said amplifier comprising at least one capacitor configured to filter a direct current component of an output of the amplifier and keep it at a value to allow polarization downstream of the amplifier. In an embodiment, the receiver further comprises: an amplifier configured to amplify a received signal, said amplifier comprising a fast comparator fed back with an error amplifier adapted to reset an offset of the received signal, said error amplifier being configured to compare an output signal of the fast comparator with a reference signal and keep a direct current component of an output signal of the amplifier at a value to polarize the receiver downstream of the amplifier. In an embodiment, the receiver further comprises a transimpedance stage configured to coupled to terminals of the receiving antenna wherein the disturbance rejection block comprises: a clamp configured to take up parasite currents present on the terminals of the receiving antenna; and a common-mode voltage follower configured to modify a polarization of the transimpedance stage in order to balance effects of the parasite currents present on the terminals of the receiving antenna. In an embodiment, the clamp comprises two circuit branches having a series of a PMOS transistor and an NMOS transistor coupled between a supply voltage and the ground and having a drain terminal in common, the PMOS transistors being driven by a reference voltage and gate and drain terminals of the NMOS transistors being configured to couple to the terminals of the receiving antenna. In an embodiment, said transimpedance stage comprises two MOS transistors having gate terminals in common and source terminals configured to couple to the terminals of the receiving antenna, and the common-mode voltage follower comprises two MOS transistors having gate and drain terminals in common and source terminals configured to couple to the terminals of the receiving antenna, the gate terminals of the transistors of the common-mode voltage follower and of the transistors of the transimpedance stage being coupled together to a polarization current generator. In an embodiment, wherein said transimpedance stage comprises two MOS transistors having a gate terminal in common and source terminals configured to couple to the terminals of the receiving antenna, and said common-mode voltage follower comprises: a series of resistors configured to couple to the terminals of the receiving antenna; and a series of first and second MOS transistors each having respective gate and drain terminals coupled together, wherein a source terminal of the first MOS transistor is coupled to a ground, the first MOS transistor has a gate terminal coupled to an intermediate terminal of said series of resistors and to the source terminal of the second transistor, and a drain terminal of the second MOS transistor being coupled to gate terminals of the transistors of the transimpedance stage and to a polarization current generator.

In an embodiment, a system comprises: a transmitter; a galvanically isolated wireless interface having a first antenna coupled to the transmitter and a second antenna; and a receiver coupled to the second antenna of the galvanically isolated wireless interface and having a disturbance rejection block configured to compensate for parasitic currents flowing between the first and second antennas at potential variations between an input and an output of the galvanically isolated wireless interface. In an embodiment, the disturbance rejection block comprises: a series of resistors configured to couple between the terminals of the second antenna; and a common-mode voltage generator configured to adjust, based on a reference voltage, a voltage between an intermediate node of the series of resistors and a ground. In an embodiment, the common-mode voltage generator comprises: a transistor output stage configured to modify the voltage between the intermediate terminal of the resistors and the ground; and a differential stage configured to receive the voltage between the intermediate terminal of the series of resistors and the ground, and the reference voltage, and to drive the transistor output stage. In an embodiment, the common-mode voltage generator comprises: two transistor output stages configured to modify voltages at respective ends of the series of resistors; and a differential stage configured to receive the voltage between the intermediate terminal of the series of resistors and the ground, and the reference voltage, and to drive the two transistor output stages. In an embodiment, the receiver further comprises: a wideband-voltage differential amplifier configured to amplify a received signal and having a cut-off frequency substantially equal to double a band-center frequency of a received signal, the amplifier comprising at least one capacitor configured to filter a direct current component of an output of the amplifier and keep it at a value to allow polarization downstream of the amplifier. In an embodiment, the receiver further comprises: an amplifier configured to amplify a received signal, the amplifier comprising a fast comparator fed back with an error amplifier adapted to reset an offset of the received signal, the error amplifier being configured to compare an output signal of the fast comparator with a reference signal and keep a direct current component of an output signal of the amplifier at a value to polarize the receiver downstream of the amplifier. In an embodiment, the receiver further comprises a transimpedance stage coupled to terminals of the second antenna and wherein the disturbance rejection block comprises: a clamp configured to take up parasite currents present on the terminals of the second antenna; and a common-mode voltage follower configured to modify a polarization of the transimpedance stage in order to balance effects of the parasite currents present on the terminals of the second antenna. In an embodiment, the clamp comprises two circuit branches having a series of a PMOS transistor and an NMOS transistor coupled between a supply voltage and the ground and having a drain terminal in common, the PMOS transistors being driven by the reference voltage and the NMOS transistors having gate and drain terminals coupled to the terminals of the second antenna. In an embodiment, the transimpedance stage comprises two MOS transistors having gate terminals in common and source terminals coupled to the terminals of the second antenna, and the common-mode voltage follower comprises two MOS transistors having gate and drain terminals in common and source terminals coupled to the terminals of the second antenna, the gate terminals of the transistors of the common-mode voltage follower and of the transistors of the transimpedance stage being coupled together to a polarization current generator. In an embodiment, the transimpedance stage comprises two MOS transistors having a gate terminal in common and source terminals coupled to the terminals of the second antenna, and the common-mode voltage follower comprises: a series of resistors coupled to the terminals of the second antenna; and a series of first and second MOS transistors each having respective gate and drain terminals coupled together, wherein a source terminal of the first MOS transistor is coupled to a ground, the first MOS transistor has a gate terminal coupled to an intermediate terminal of said series of resistors and to the source terminal of the second transistor, and a drain terminal of the second MOS transistor being coupled to gate terminals of the transistors of the transimpedance stage and to a polarization current generator.

In an embodiment, a receiver comprises: means for rejecting common-mode transients of signals received through a galvanically isolated wireless interface at potential variations between an input and an output of the galvanically isolated wireless interface; and means for amplifying signals received from the galvanically isolated wireless interface. In an embodiment, the means for rejecting comprises: a series of resistors configured to couple between terminals of a receiving antenna of the wireless interface; and means for adjusting a voltage between an intermediate terminal of said series of resistors and a ground based on a reference voltage. In an embodiment, the means for adjusting comprises: a transistor output stage configured to modify the voltage between the intermediate terminal of the series of resistors and the ground; and a differential stage configured to receive said voltage between the intermediate terminal of said series of resistors and the ground and said reference voltage, and to drive the transistor output stage. In an embodiment, the means for adjusting comprises: means for modifying voltages at respective ends of the series of resistors; and means for driving the means for modifying based on the voltage between the intermediate terminal of the resistors and the ground, and the reference voltage. In an embodiment, the means for amplifying comprises: a wideband-voltage differential amplifier configured to amplify a received signal and having a cut-off frequency substantially equal to double a band-center frequency of a received signal, said amplifier having means for filtering a direct current component of an output of the amplifier and maintaining polarization. In an embodiment, the means for amplifying comprises means for maintaining polarization of received signals. In an embodiment, the means for maintaining polarization comprises a fast comparator fed back with an error amplifier adapted to reset an offset of a received signal, said error amplifier being configured to compare an output signal of the fast comparator with a further reference signal and keep a direct current component of an output signal of the amplifier at a value to polarize the receiver downstream of the amplifier. In an embodiment, the receiver comprises means for converting a current signal to a voltage signal, wherein the means for rejecting comprises: means for clamping the terminals of the antenna; and means for modifying a polarization of the transimpedance stage. In an embodiment, the receiver further comprises means for decoding received signals.

In an embodiment, a method comprises: receiving a signal through a galvanically isolated wireless interface having first and second antennas; rejecting common-mode transients of the received signal at potential variations between an input and an output of the galvanically isolated wireless interface; and amplifying the received signal. In an embodiment, the method further comprises decoding the amplified signal. In an embodiment, the rejecting comprises: adjusting, based on a reference voltage, a voltage at an intermediate node of a series of resistors coupled between terminals of the second antenna of the wireless interface. In an embodiment, the adjusting comprises: modifying voltages at respective ends of the series of resistors. In an embodiment, the amplifying comprises: filtering a direct current of the amplified signal while maintaining polarization.

BRIEF DESCRIPTION OF THE SEVERAL VIEWS OF THE DRAWINGS

The features and advantages of embodiments of the present disclosure will be apparent from the following detailed description of a practical embodiment thereof, shown by way of non-limiting example in the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, decoders and encoders, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

A problem of structures with coupled inductors is the presence of parasite capacitances between the inductors themselves. These capacitances introduce an unwanted capacitive coupling between the turns thus causing currents (proportional to the parasite capacitances according to the formula $$I = C\frac{dv}{dt})$$

at potential variations between the transmission and reception circuits.

The faster the potential variation, the higher these currents are (they may also be of the order of tens of kV/us) and the input impedance being non-null, they change the polarization of the receiver circuits thus causing the loss of data and possibly the breakage thereof. This phenomenon is commonly referred to as noise due to a common-mode transient.

The turns of said galvanically isolated interfaces have electric features assimilable to those of a transformer and therefore the transmitting turn may be denoted as primary and the receiving turn may be denoted as secondary.

Figure 1:
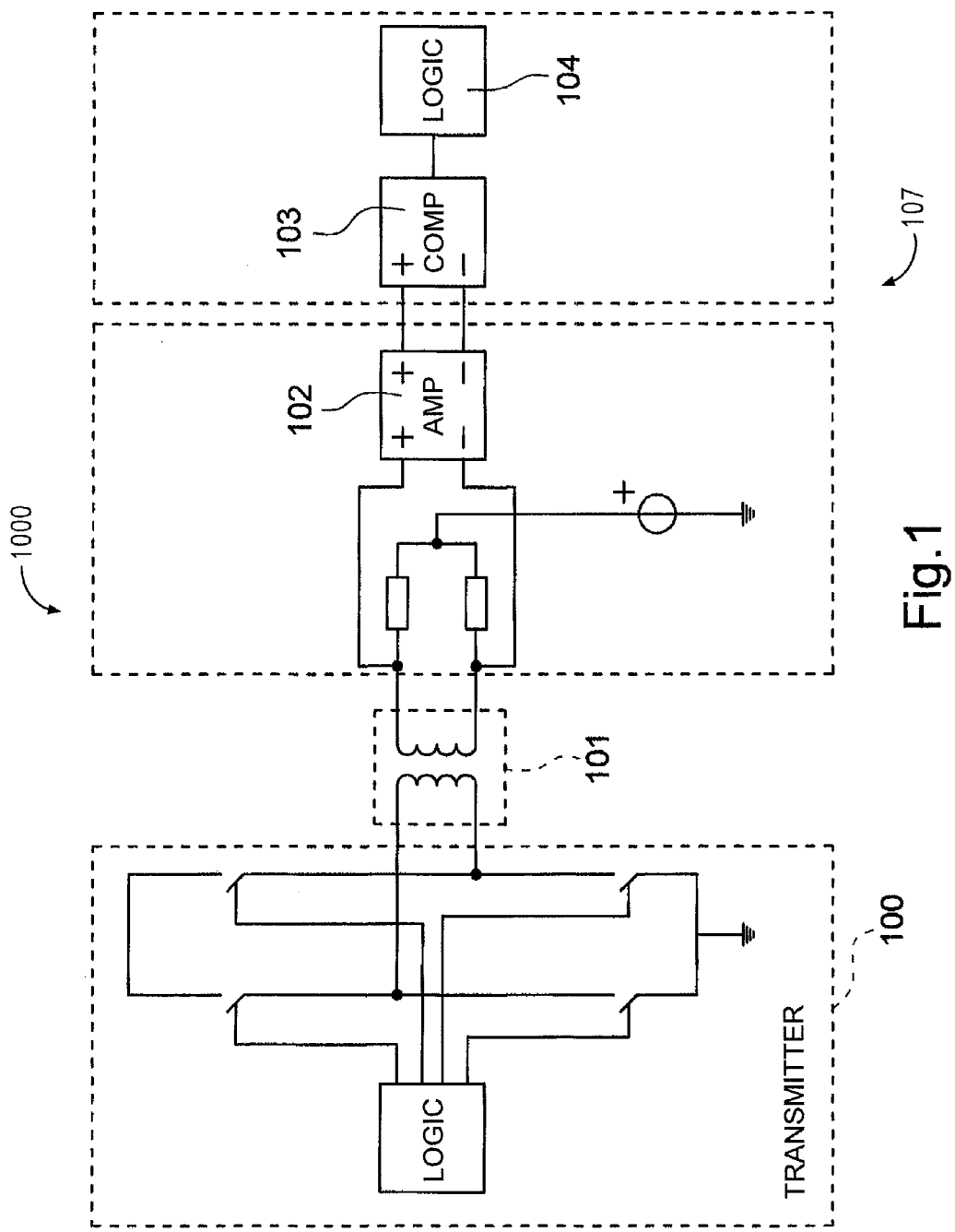
FIG. 1 shows a communication system with a galvanic isolation interface in a differential configuration both to the primary and to the secondary.
Figure 2:
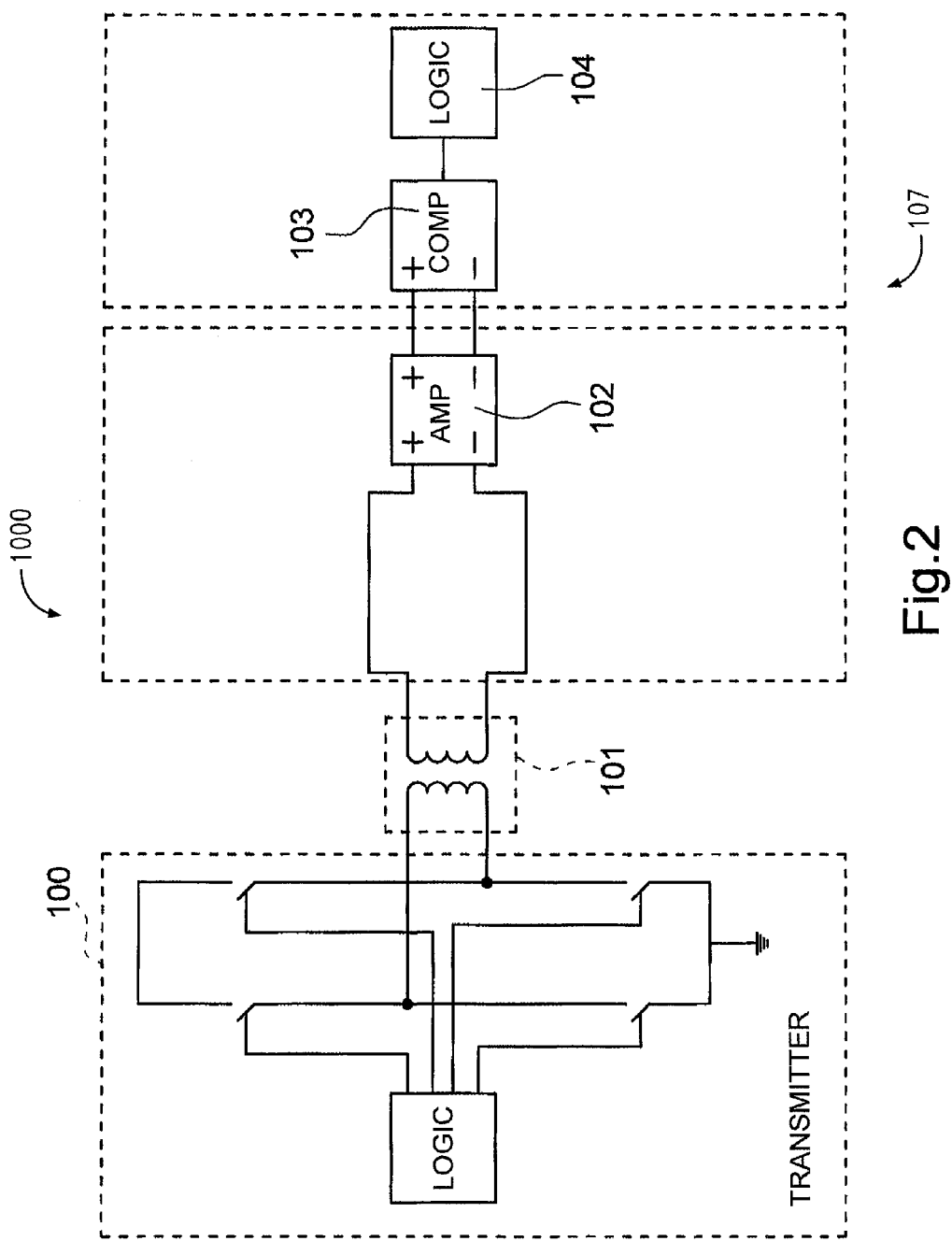
FIG. 2 shows a communication system as shown in FIG. 1 having with a current amplifier.

The data transmission through the primary and the secondary is usually achieved by means of a modulated radiofrequency signal or by sending current pulses. Circuit diagrams of typical transmitter-receiver architectures 1000 in which microantennas are used, is shown in FIGS. 1 and 2 (in these figures the microantennas are schematized as inductors). The transmitter-receiver system comprises a transmitter 100, an interface 101, a receiver 107 comprising an amplifier 102, a comparator 103 and a logic circuitry 104.

The diagrams shown display a differential architecture both to the primary and to the secondary, such a solution permits to obtain a higher immunity to common-mode disturbances. According to a variation of the shown diagram, one or both the inductors have a terminal each referred to its ground GND.

Figure 3:
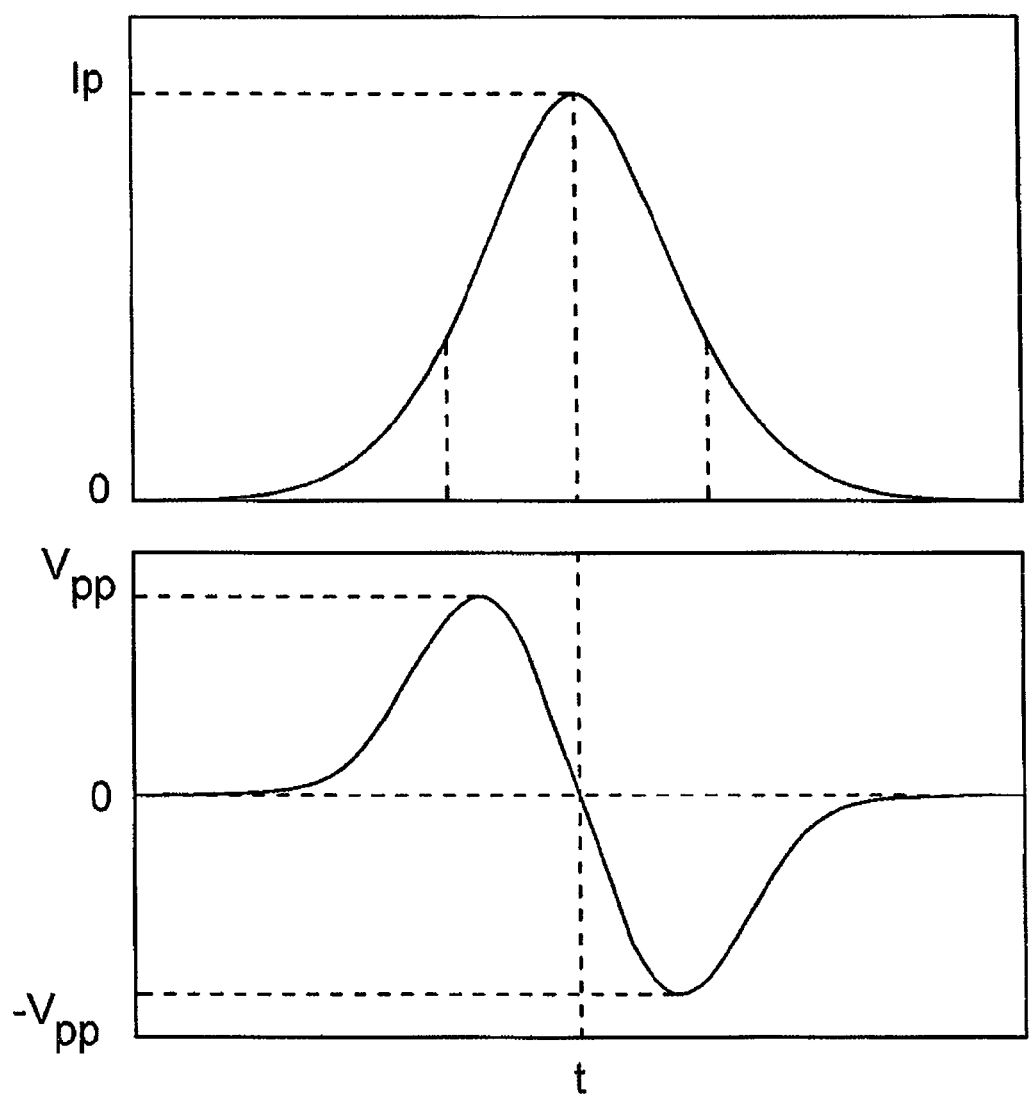
FIG. 3 shows the waveform of a current pulse transmitted by the primary and the corresponding waveform of the signal received at the secondary.

In order to better understand how this type of architecture may be exploited to transmit information, it is useful to observe the waveforms related to the transmission of a current pulse Ip through coupled inductors, as seen in FIG. 3.

The voltage at the receiver has a positive pulse with a maximum width Vpp followed by a negative one with a minimum width −Vpp, when the current pulse Ip to the transmitter is positive and vice versa if the current pulse is negative. Therefore, by associating information with the current pulse orientation, data may be transmitted through the isolation interface.

A typical coding/decoding technique involves associating a positive (negative) current pulse with a positive (negative) side of a logic signal, as described in US patent publication number 2008/0069249. The signal received at the secondary is amplified before being decoded; if the coupling coefficient of the two inductors is sufficiently great, the signal at the secondary may have a sufficiently wide width to permit the decoding without using the amplifier stage. Using current pulses for transmitting the signal permits to decrease the system consumptions and increase the transmission bit rate. Furthermore, by exploiting both pulses at the secondary, the signal transmission may be strengthened thus making the decoding more reliable.

By generating a transmission current pulse with a convenient Gaussian form, a waveform may be obtained at the secondary with pulses of the desired duration thus minimizing the system current consumptions. The used technology imposes a limit lower than the pulse duration, as the band of the received signal being inversely proportional to the duration of the transmitted pulse, it is desirable to prevent it from urging the resonance frequency of the receiver (basically depending on parasites).

Furthermore if the pulse duration is lower than or comparable to the time constant of the inductor (depending on its inductance and the parasite series impedance), the received signal will have the second pulse more weakened than the first, which represents a limitation from the point of view of the strength of the system in the presence of disturbances. Indeed, noises injected into the receiver from close circuits which are particularly noisy (for example, due to an imperfect symmetry in the layout of the differential circuits) may be detected as pulses from the transmitter and therefore erroneously decoded. This problem may be obviated by duplicating the information, i.e., by transmitting two consecutive pulses which code the same data and minimizing the possibility that the noise pulse is decoded as valid, but this results in decreasing the maximum bit rate. Therefore, the optimal duration of the pulse is typically higher than the typical time constant of the inductor and such that the received signal does not urge the typical resonance frequency of the receiver.

Figure 4:
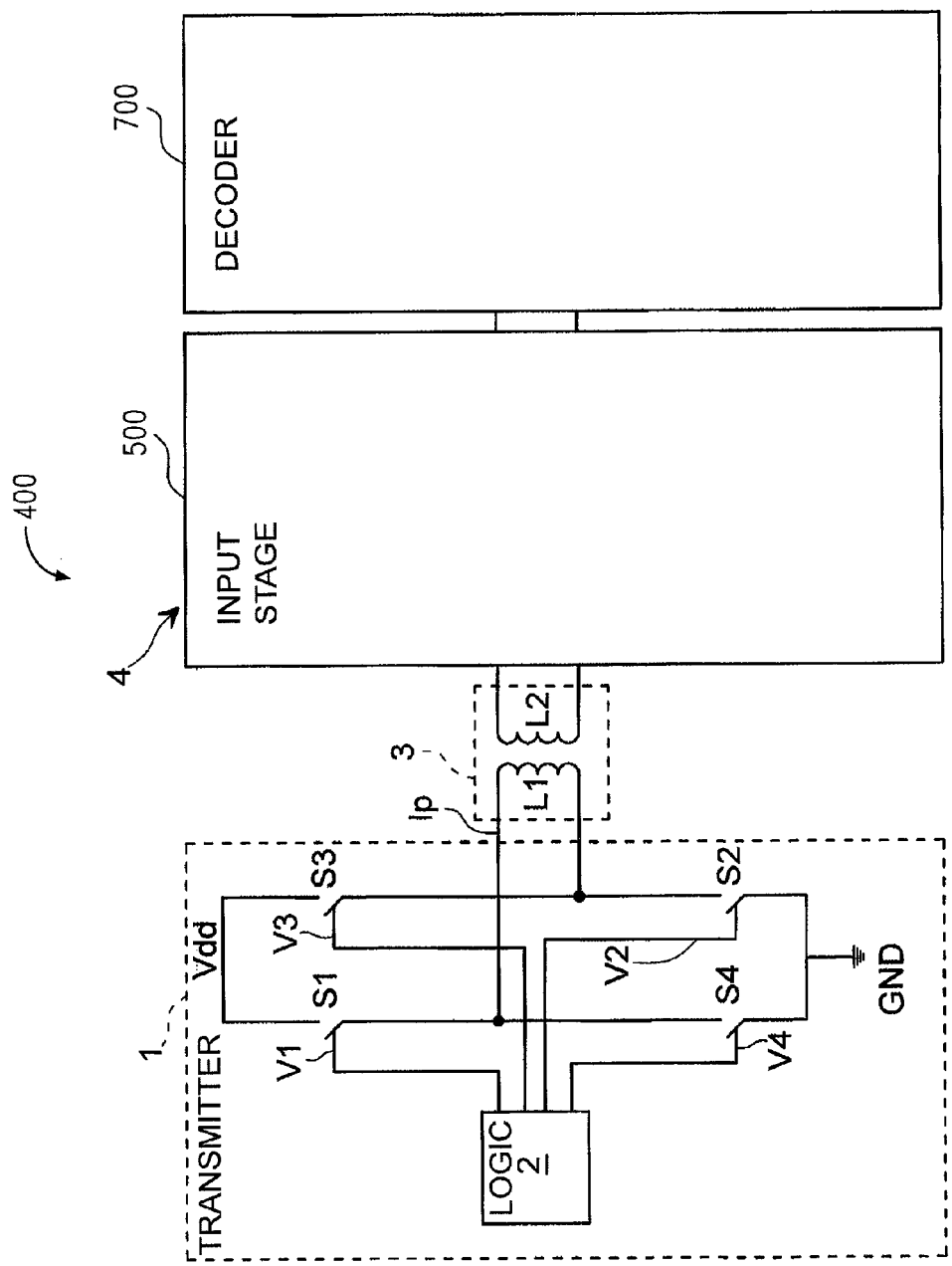
FIG. 4 shows a communication system with a galvanic isolation interface in accordance with an embodiment.

FIG. 4 shows an embodiment of a communication system 400 with a galvanic isolation interface in accordance with the present disclosure. Said system is of the differential type both in transmission and in reception but it may also be of the non-differential type. The system comprises a transmitter 1 with a logic circuitry 2 receiving at the input the data to be transmitted and the synchronizing signal (the clock) and generates a coded signal, preferably, at the clock sides, a current pulse Ip as shown in FIG. 3. The pulse direction denotes the logic level of the data to be transmitted. The transmitter comprises four switches S1-S4, S2-S3 in a bridge configuration bonded between the voltage Vdd and the ground GND and having the middle points bonded to the primary L1, i.e., to the transmitting antenna or turn of the integrated, galvanic isolation interface 3, for example, of the wireless type. The switches are driven by the logic circuitry 2 by means of the signals V1-V4; the logic circuitry 2 is adapted to switch off the switches S1, S2 to generate the current pulse Ip which codes data at a high (or low) logic level and the switches S3, S4 for coding data at a low (or high) logic level. By conveniently controlling the signal sides V1-V4, the waveform of the current pulse Ip may be modeled such that it approximates a Gaussian pulse with the desired duration, as described in FIG. 3.

Figure 5:
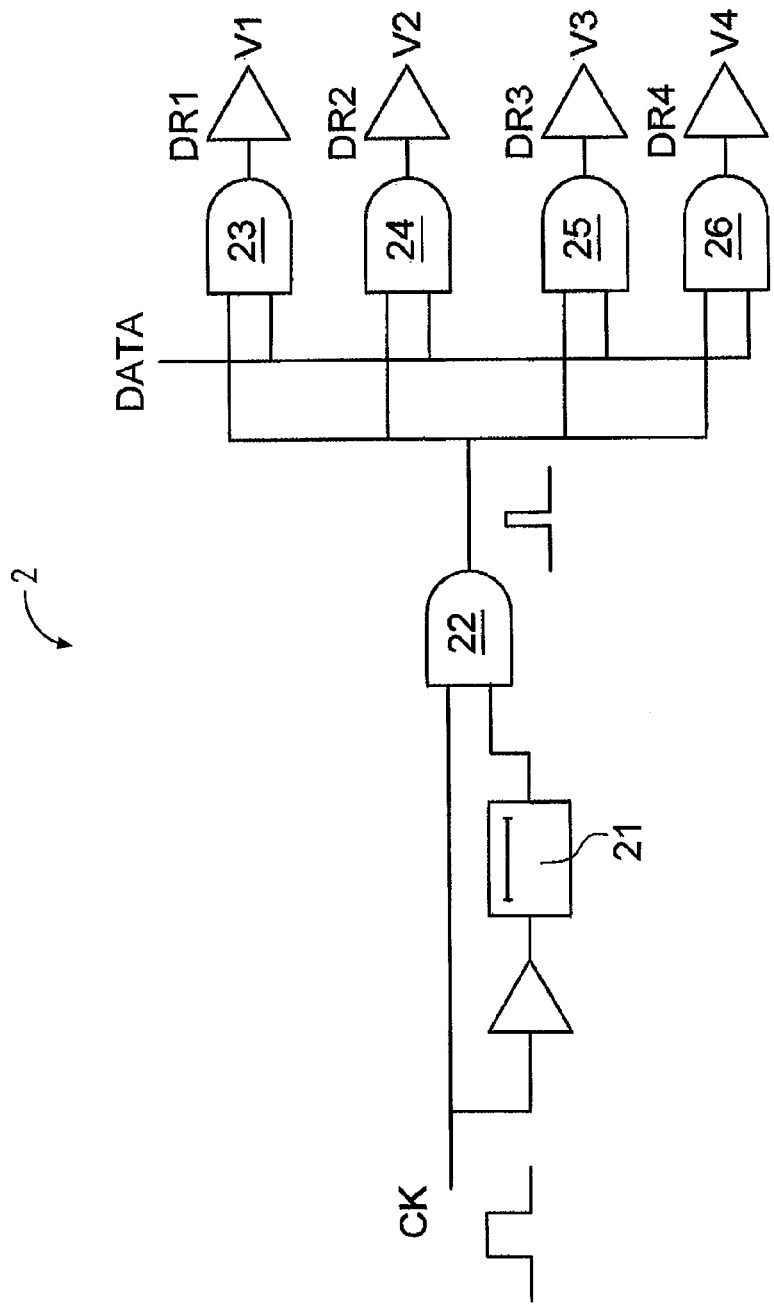
FIG. 5 shows a diagram of an embodiment of logic circuitry suitable for use in the communication system transmitter of FIG. 4.

A possible implementation of the logic circuitry 2 of the transmitter is shown in FIG. 5. At the positive side of the clock signal CK, a pulse of about the same duration as the current pulse to be transmitted is generated, through the delay cell 21 and the AND-type logic port 22. The signal at the output of the AND port 22 is sent to four AND ports 23-26 also having at the input the data signal DATA, the AND ports 23-26 implement a demultiplexer generating four signals according to the logic level of the data to be transmitted. These signals are at the input of four drivers DR1-DR4 which generate the signals V1, V2, V3, V4 for driving the switches S1-S4. The four drivers DR1-DR4 are conveniently dimensioned to generate the Gaussian current pulse Ip. In the absence of transmission, the switches S2 and S4 may be switched off, this ensures that in the presence of common-mode transients between the primary winding L1 and the secondary winding L2, i.e., the receiving antenna or turn of the interface 3, the currents flowing are "conveyed" towards the ground GND. The turns L1 and L2 have electric features similar to those of a transformer.

The system comprises a receiver 4, which as illustrated has an input stage 500, which amplifies the signal Ir present on the secondary L2 of the interface 3; if the transmitted signal is the signal Ip, the signal Ir has a positive pulse with a maximum width Vpp followed by a negative pulse with a minimum width −Vpp, when the current pulse Ip to the transmitter is positive and vice versa if the current pulse is negative. The receiver is provided with a decoder 700 which decodes the received pulses and reassembles the data signal DATA and the clock signal OK.

In accordance with a first embodiment, the input stage 500 comprises a circuit for rejecting the common-mode transients, i.e., adapted to decrease the input impedance in the presence of parasite currents due to a common-mode transient and therefore adapted to compensate for the parasite currents flowing between the transmitting turn and the receiving turn at the potential variations between the input and the output of the galvanic isolation interface.

One approach for implementing the input stage comprises amplifying the currents outputted from the secondary. Another approach comprises amplifying the voltage at its ends.

Figure 6A:
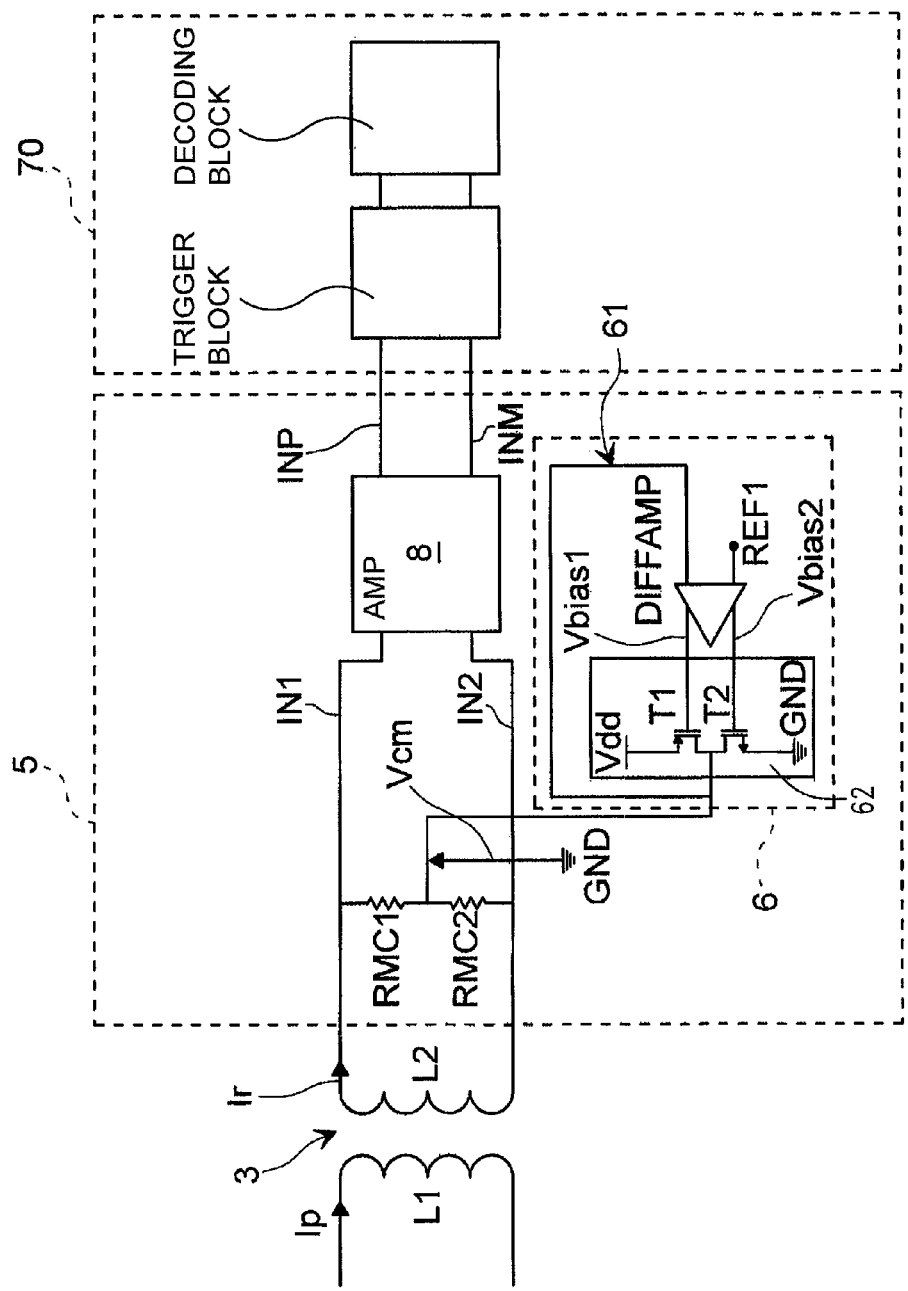
FIG. 6a shows the receiver for a communication system in accordance with a first embodiment.

In accordance with a first embodiment, FIG. 6a shows an input stage 5 and a decoder 70 suitable for use, for example, as the input stage 500 and the decoder 700 of the embodiment of FIG. 4. As illustrated in FIG. 6a, at the input stage 5 to the differential received signal Ir a common-mode component is added so as to polarize the amplifier through the resistors RMC1 and RMC2 and the output Vcm of the common-mode voltage generator circuit 6 for rejecting the common-mode transients. The circuit 6 provides the voltage Vcm at the output, between the common terminal of the two resistors RMC1 and RMC2 and the ground GND, adjusted to the reference value REF1 and configured to compensate for the parasite currents flowing between the primary L1 and the secondary L2 of the interface 3 at the potential variations between input and output of the galvanic isolation interface. As illustrated in FIG. 6a, the decoder 70 may comprise trigger and decoding blocks. While FIG. 6a illustrates a series of two resistors and a voltage at a common terminal of the two resistors, an embodiment may comprise a series of more than two resistors and adjust a voltage at an intermediate node of the series of resistors.

Circuit 6 may comprise a closed-loop buffer 61 but an open-loop buffer or any other solution may also be used. The closed-loop buffer 61 comprises a differential stage DIFFAMP driving the output stage 62 comprising the series of two transistors T1 and T2, arranged between the supply voltage Vdd and the ground GND, configured to provide (or take up) the currents due to the parasite effects; the signals Vbias1 and Vbias2 from the differential stage DIFFAMP drive the PMOS transistor T1 and the NMOS transistor T2, respectively. The voltage Vcm is the voltage on the common output terminal of the transistors T1 and T2 and the differential stage has the voltage Vcm on the inverting input terminal and the voltage REF1 on the non-inverting input terminal.

Figure 6B:
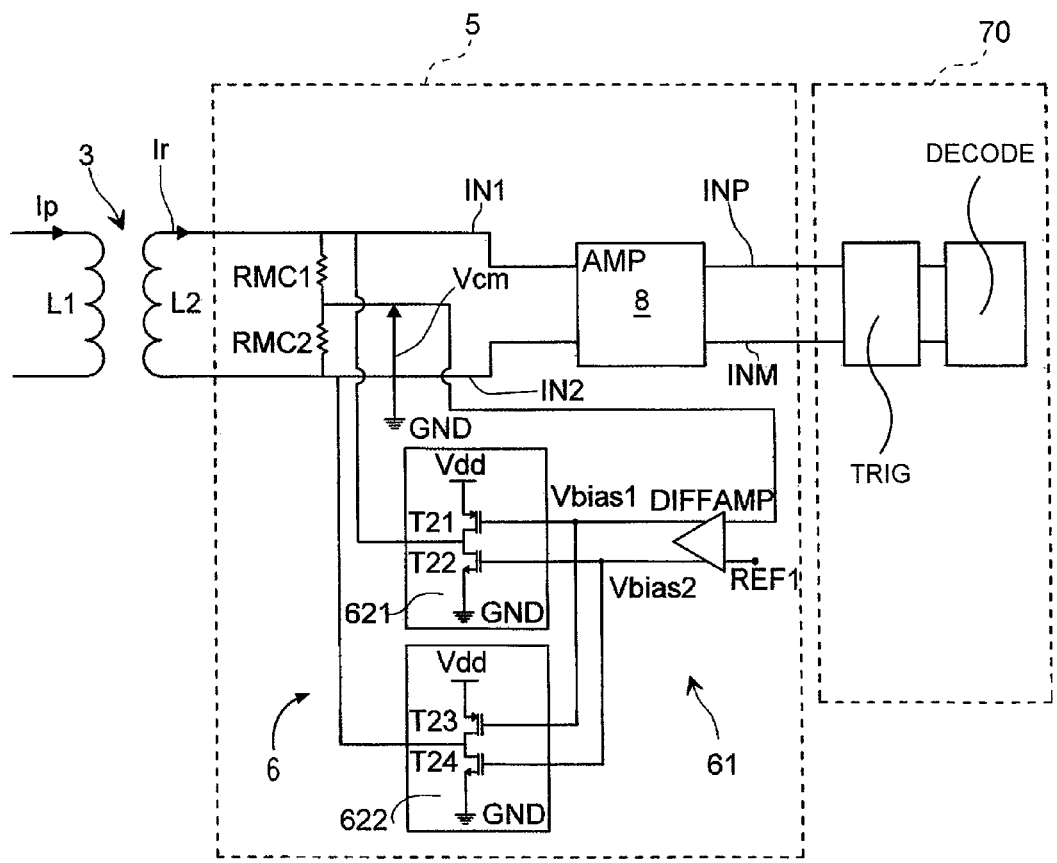
FIG. 6b shows the receiver for a communication system in accordance with a variation of the first embodiment.

In accordance with a variation of the first embodiment shown in FIG. 6b, circuit 6 comprises a buffer 61 comprising a differential stage DIFFAMP driving two output stages 621 and 622, each comprising a series of two transistors T21, T22 and T23, T24, arranged between the supply voltage Vdd and the ground GND, capable of providing (or taking up) the currents due to the parasite effects, the signals Vbias1 and Vbias2 from the differential stage DIFFAMP drive the PMOS transistor T21, T23 and the NMOS transistor T22, T24, respectively. The voltage Vcm is the voltage on the common terminal of the resistors RMC1 and RMC2. The differential stage has the voltage Vcm on the inverting input terminal and the voltage REF1 on the non-inverting input terminal and the outputs of the two stages 621 and 622 are bonded to the terminals of the inductance L2.

Input stage 5 comprises an amplifier 8 which may be implemented in different ways, in general, its function is amplifying the high frequency components of the signal Ir by keeping the direct current component unaltered.

Figure 7:
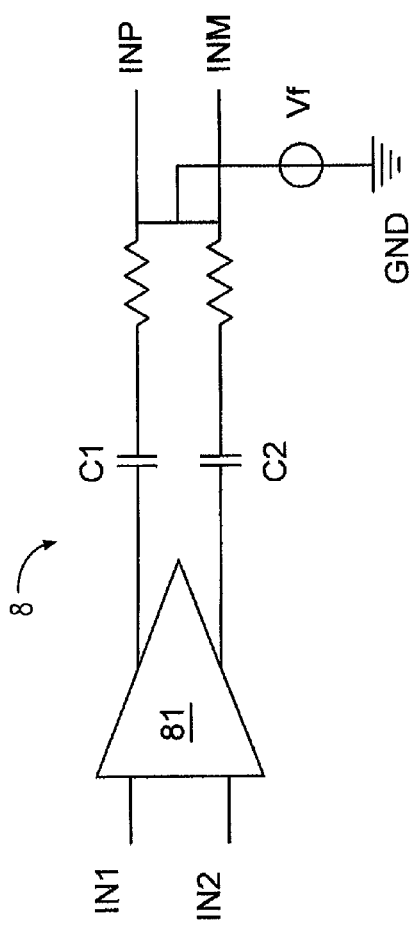
FIG. 7 shows an embodiment of a circuit implementation of the amplifier of FIG. 6a or 6b.

A first implementation of the amplifier 8, shown in FIG. 7, comprises a wideband voltage differential amplifier 81 with a cut-off frequency of about 2fp, with fp being a band-centre frequency of the signal Ir received at the secondary L2 and at the input of the terminals IN1 and IN2. The output direct current component on the terminals INP and INM is filtered through the capacitances C1 and C2 and applied again through the tension generator Vf to permit the correct polarization of the circuit downstream of the amplifier.

Figure 8:
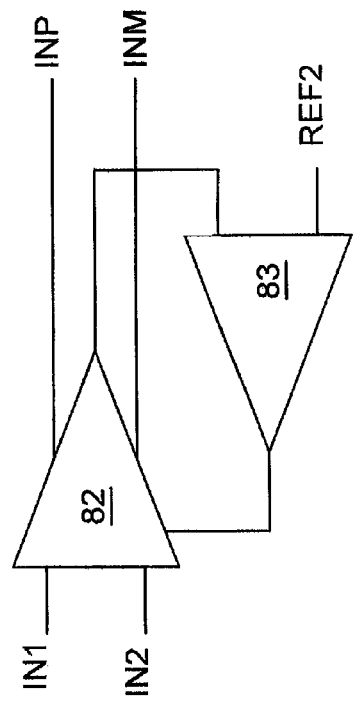
FIG. 8 shows an embodiment of another circuit implementation of the amplifier of FIG. 6a or 6b.

A second implementation of the amplifier 8, shown in FIG. 8, comprises a fast comparator 82 fed back with an error amplifier 83 which resets the offset of the signal Ir at the input of the terminals IN1 and IN2 and keeps the direct current component of the signal at the output of the terminals INP and INM at a value to polarize the circuit downstream of the amplifier. The error amplifier 83 is adapted to compare the signal at the output of the fast comparator 82 to a reference signal REF2.

Figures 9, 10A:
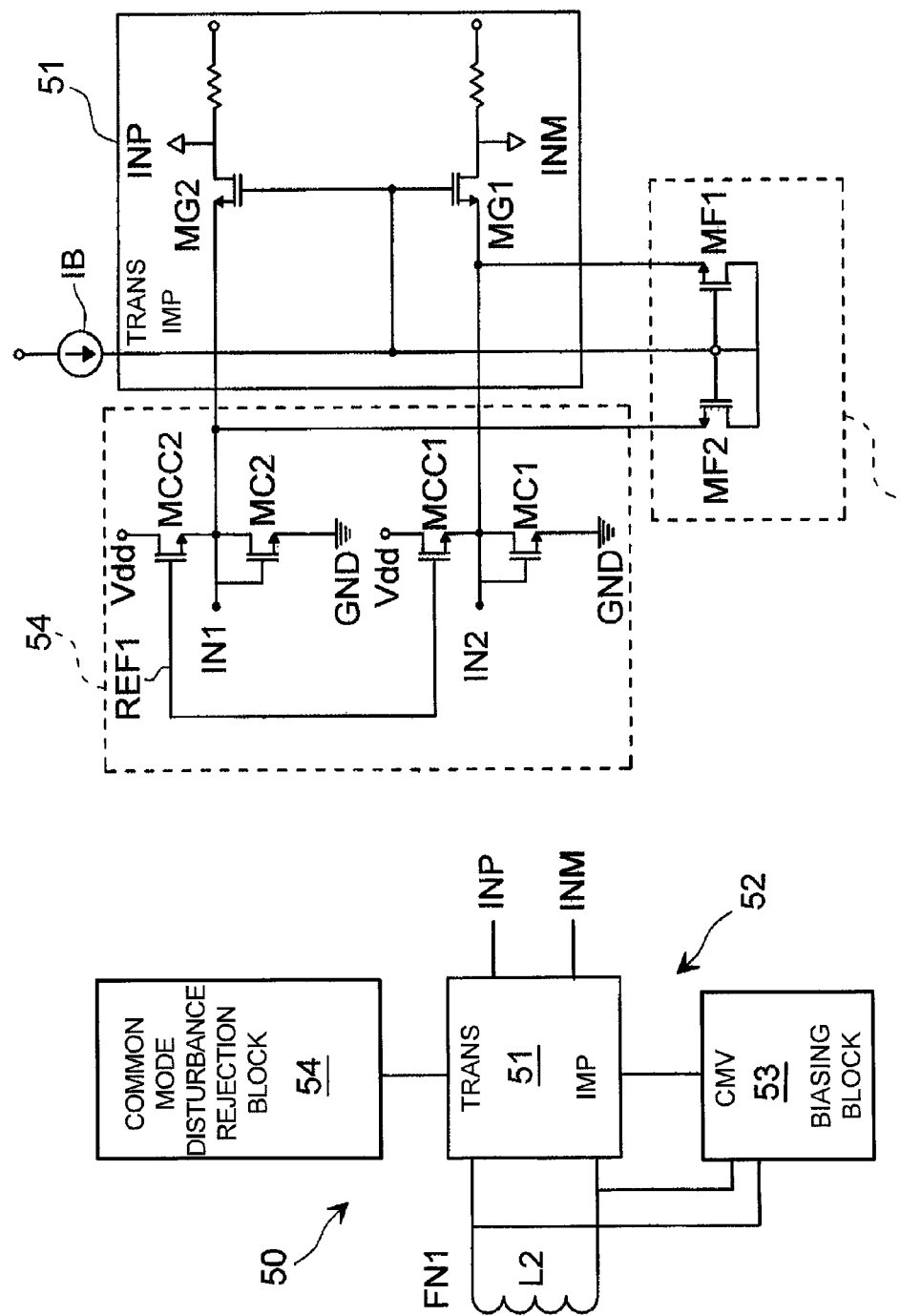
FIG. 9 shows a block diagram of an embodiment of the input stage of the receiver in FIG. 6a or 6b in accordance with a variation of the first embodiment.
FIG. 10a is a circuit diagram of an embodiment of the input stage in FIG. 9.

In accordance with another variation of the first embodiment of the disclosure, if the signal to be amplified on the secondary L2 is a current signal, a current amplifier circuit is used. FIG. 9 describes a different input stage 50 usable for example in the receiver in FIG. 4 and may be considered as a variation of the input stage 5. It comprises a transimpedance stage 51 to amplify the current signal Ir received and present on the secondary L2 and from a stage 52 for rejecting the noises due to the common-mode transients. In some embodiments, the transimpedance stage may comprise, for example, an amplifier or a level shifter. The rejection stage 52 comprises a common mode disturbance rejection block 54, which may comprise, for example, a clamp, which takes up the inputting currents, and a common-mode voltage biasing block 53, which may comprise, for example, a voltage follower, adapted to modify the polarization of the transimpedance stage 51 in order to balance the effect of the parasite currents.

The transimpedance stage 51, as illustrated in FIG. 10a, comprises MOS transistors MG1 and MG2 which are polarized in a common-gate configuration. The clamp circuit 54 has the MOS transistors MC1 and MC2 taking up the common-mode currents inputted from the terminals of the secondary L2 and the MOS transistors MCC1-MCC2 providing the currents outputted from the abovementioned terminals. In some embodiments, the presence of the clamp circuit 54 only may not be sufficient to oppose the effect of the currents due to the common-mode transients; for such a reason stage 53 has been added, permitting to dynamically modify the polarization of the transistors MG1-MG2 to increase the current they dispense towards the input terminals IN1 and IN2. The input terminals IN2 and IN1 are bonded to respective source terminals of the transistors MG1 and MG2, respective gate and drain terminals of MOS transistors MC1 and MC2, and respective source terminals of the transistors MF1 and MF2 belonging to stage 53. The latter comprises the differential stage of the two transistors MF1 and MF2 having the gate and drain terminals in common. The MOS transistors MC1 and MC2 have the source terminals bonded to the ground GND and the drain terminals bonded to the respective source terminals of the transistors MCC1-MCC2 having the drain terminals bonded to a supply voltage VDD and the gate terminals bonded to the reference voltage REF1. The drain terminals of the transistors MG1 and MG2 are the output terminals INP and INM of the amplifier circuit 50; a polarization current IB is sent to the common gates of the transistors MG1-MG2 and MF1-MF2.

Figure 10B:
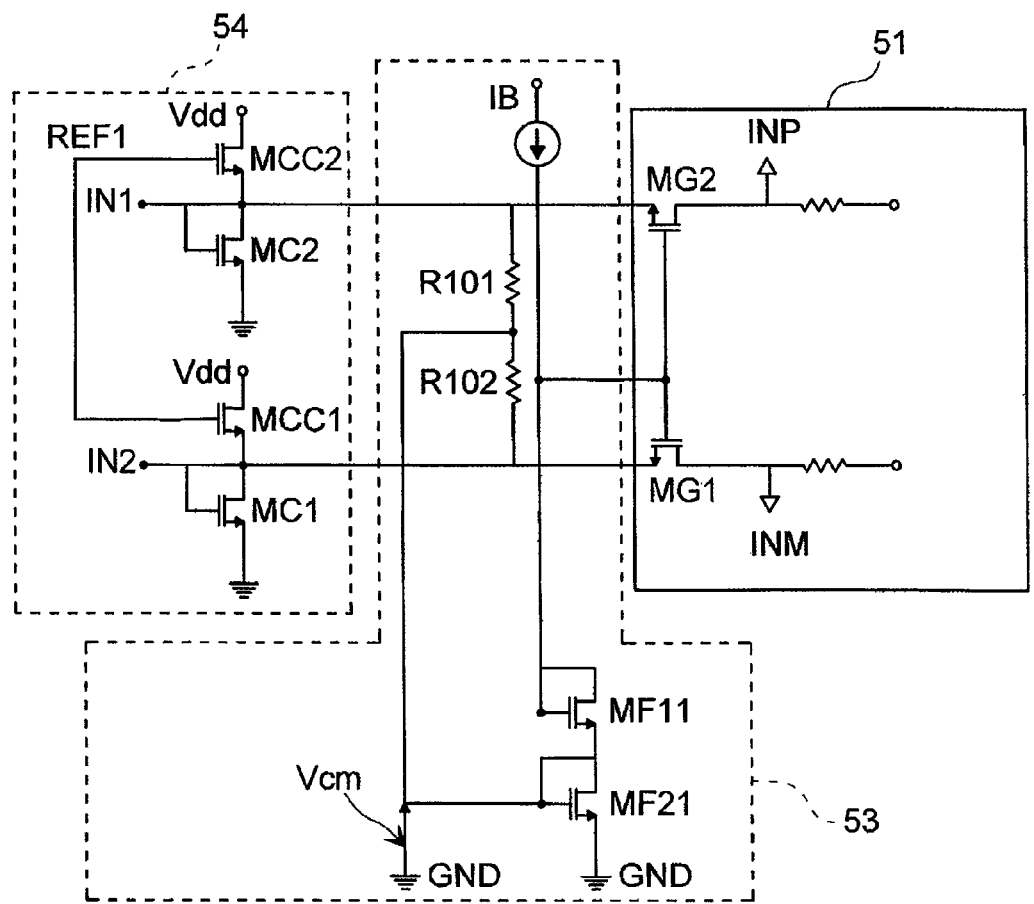
FIG. 10b is another circuit diagram of an embodiment of the input stage in FIG. 9.

In an alternative embodiment, as seen in FIG. 10b, stage 53 may be obtained by the series of two resistors R101 and R102 bonded between the terminals IN1 and IN2 and the series of two transistors MF11 and MF21 having the drain terminals bonded to the respective gate terminals and the source terminal of the transistor MF21 bonded to the ground GND and the drain terminal bonded to the source terminal of the transistor MF11 having the drain terminal bonded to the polarization current generator IB and the gate terminals of the transistors MG1 and MG2. The common-mode voltage Vcm is on the gate terminal of the transistor MF21.

Referring to FIG. 4, the signal at the output of the input stage 500 is sent to a decoder 700, which may be of a known type, for decoding the received signal.

Figure 11:
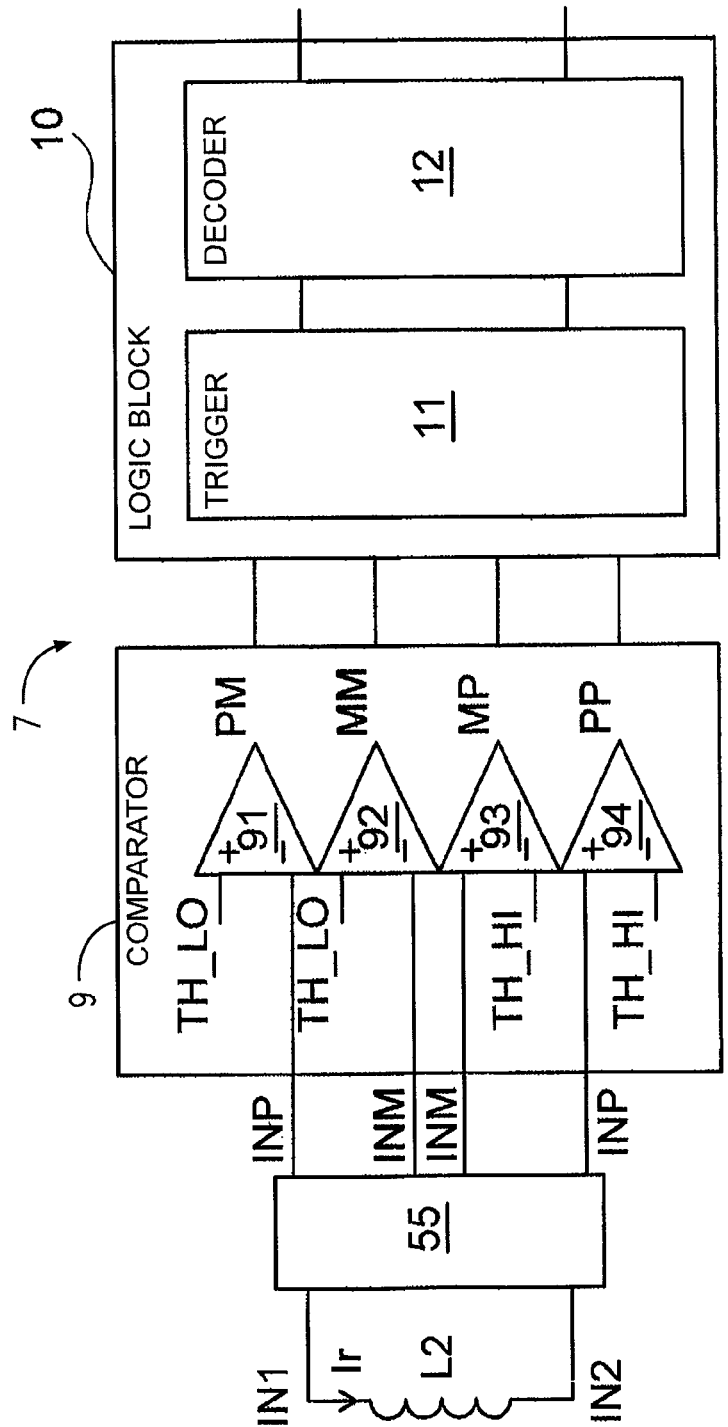
FIG. 11 shows the receiver for a communication system in accordance with a second embodiment.

In accordance with a second embodiment of the disclosure, the signal Ir present on the receiving turn L2 and amplified by an amplifier of the known type 55 is sent through the terminals INP and INM to a discriminator stage 7 adapted to decode the received signals, as shown in FIG. 11. Discriminator stage 7 may be employed, for example, as the decoder 700 of an embodiment of the system shown in FIG. 4. If amplifying the signal Ir present on the turn L2 is not required, the inputs INP and INM of the discriminator 7 match with the terminals IN1 and IN2 of the turn L2.

Said discriminator 7 comprising means 9, 11 capable of triggering decoding means 12 of the received signal only if the value of the waveform of the received signal Ir is outside a logic hysteresis consisting of a first logic threshold (TH_LO) having a value smaller than the value of the direct current component Irdc of the received signal and a second logic threshold (TH_HI) having a value greater than the value of the direct current component of the received signal.

The discriminator stage 7 comprises a comparator stage 9 and a logic block 10. If the signal Ir is a differential signal, the comparator stage 9 comprises four comparators 91-94 adapted to turn the pulses of the differential signal Ir at the input through the terminals INP and INM into four logic pulses PM, MM, MP and PP comparing the input signals to the reference logic thresholds TH_LO and TH_HI, the threshold TH_LO of which has a value smaller than the direct current component of the differential signals INP and INM, while the threshold TH_HI has a value greater than the direct current component of the signals INP and INM. Thereby, a voltage range is targeted within which the signal variations are ignored. By conveniently adjusting these thresholds, a part of the noise at the input of the receiver or possibly introduced by the amplifier itself may be filtered. The logic block 10, according to the order of reception of the signals PM, MM, MP and PP, decodes the data and generates an output clock which is synchronous with the decoded data.

Figure 12:
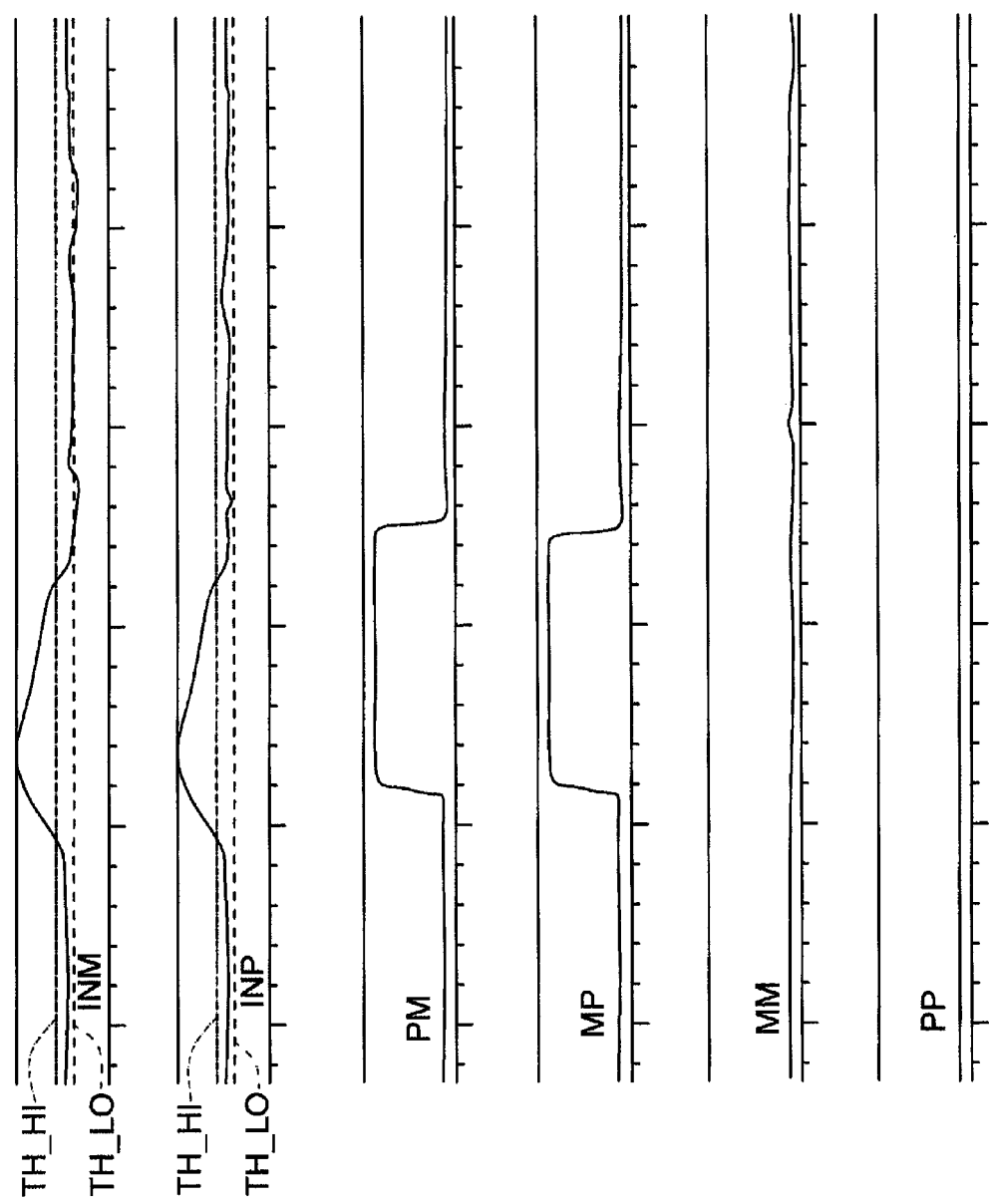
FIG. 12 shows the time diagrams of the signals involved in the comparator block of the discriminator in FIG. 11 in the presence of disturbances.

However, this expedient may not be enough to avoid possible disturbances from being interpreted as useful signals. Indeed, a common-mode noise could be introduced from the outside of the amplification chain through the ground or power supply or due to an imperfect symmetry of the layout of the differential circuits. If the width of this noise is such that both the signal INP and the signal INM are either above or below the thresholds, the comparators 91-94 switch and thus generate logic signals that could be interpreted as a useful signal, as seen in FIG. 12. For this reason performing a time sequence control of the logic signals may be used to filter a possible disturbance.

The discriminator 7 and in particular the logic block 10 is further capable of targeting possible spurious input signals caused by disturbances. Indeed, if the sequence of the received pulses does not meet the predicted order, the received data and the corresponding clock may be considered invalid and thus ignored.

Figure 13:
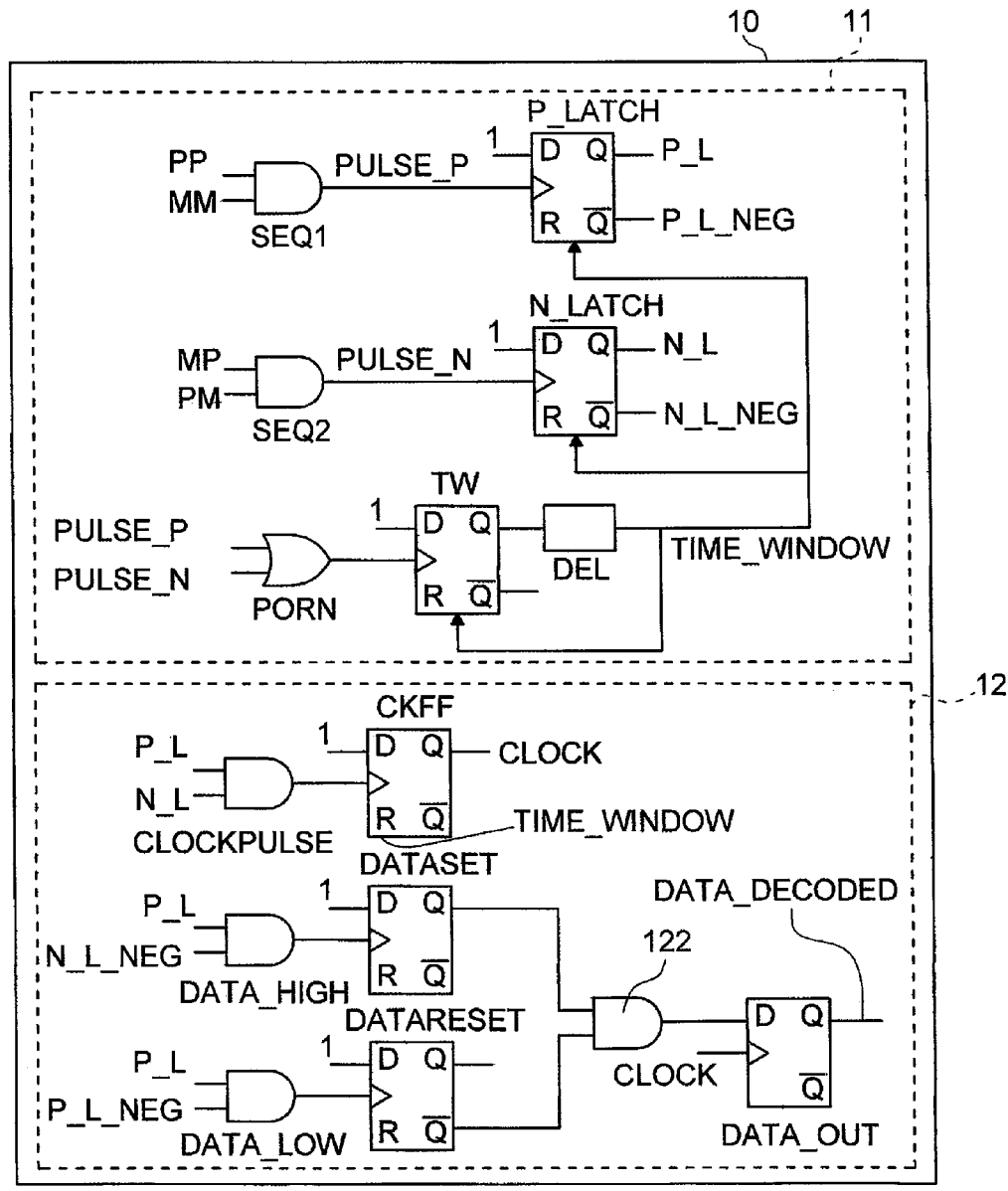
FIG. 13 shows a more detailed logic block of an embodiment of the discriminator in FIG. 11.

In an embodiment, the logic block 10 comprises other means SEQ1, SEQ2 adapted to allow pulses to be generated for decoding the received signal only if the generation of a logic signal due to the comparison of the first component INP of the differential signal with one of the first logic threshold TH_LO or the second logic threshold TH_HI corresponds to the generation of a logic signal due to the comparison of the second component INM of the differential signal with the other of the first or second logic threshold. Indeed, the logic circuit 10 comprises a trigger circuit 11 which comprises, in turn, as shown in FIG. 13, two AND logic ports SEQ1 and SEQ2 having at the input the signals PM, MM, MP and PP and having at the output logic pulses PULSE_P and PULSE_N only if the sequence is that shown in FIG. 14. Otherwise, if there is a disturbance, as shown in FIG. 12, the output of the AND port SEQ1 remains zero.

Furthermore the presented system introduces a further grade of disturbance immunity.

In an embodiment, discriminator 7 comprises control means adapted to set up a given time period TIME_WINDOW starting from the generation of the first pulse PULSE_P or PULSE_N of said other means; the control means are adapted to check whether within said time period the second pulse PULSE_N or PULSE_P is generated and are adapted to trigger said decoding means of the received signal only if the check result is positive. Circuit 11 is adapted to implement the control function on the time sequence of the logic signals. Indeed, the signals PULSE_P and PULSE_N are at the input of two latches P_LATCH and N_LATCH having at the output the signals P_L, P_L_NEG and N_L, N_L_NEG. The signals PULSE_P and PULSE_N are at the input of a NOR port POR_N, the output of which is at the input of another latch TW; the output Q of the latch TW is at the input of a delay cell DEL adapted to provide the time window TIME_WINDOW as the reset signal R of the latches TW, P_LATCH and N_LATCH. If a first couple of pulses between the pulses PM, MM, MP and PP meeting the described conditions comes, the time window TIME_WINDOW, the duration of which depends on the expected duration of the pulses, is started. If within such a time window the predicted couple of pulses comes, the clock signal and the data synchronous therewith is decoded. Whether the second couple of pulses did not present within the window, the signal which generated the first couple of pulses would be interpreted as a disturbance and thereby clock and data would not be decoded. The clock and data recovery circuit 12 comprises an AND port CLOCKPULSE having at the input the signals P_L and N_L and the output of which is at the input of the latch CKFF providing the clock signal CLOCK; therefore, said clock signal CLOCK is decoded through the logic port CLOCKPULSE and the latch CKFF only if the two couples of pulses are correctly received.

Figure 14:
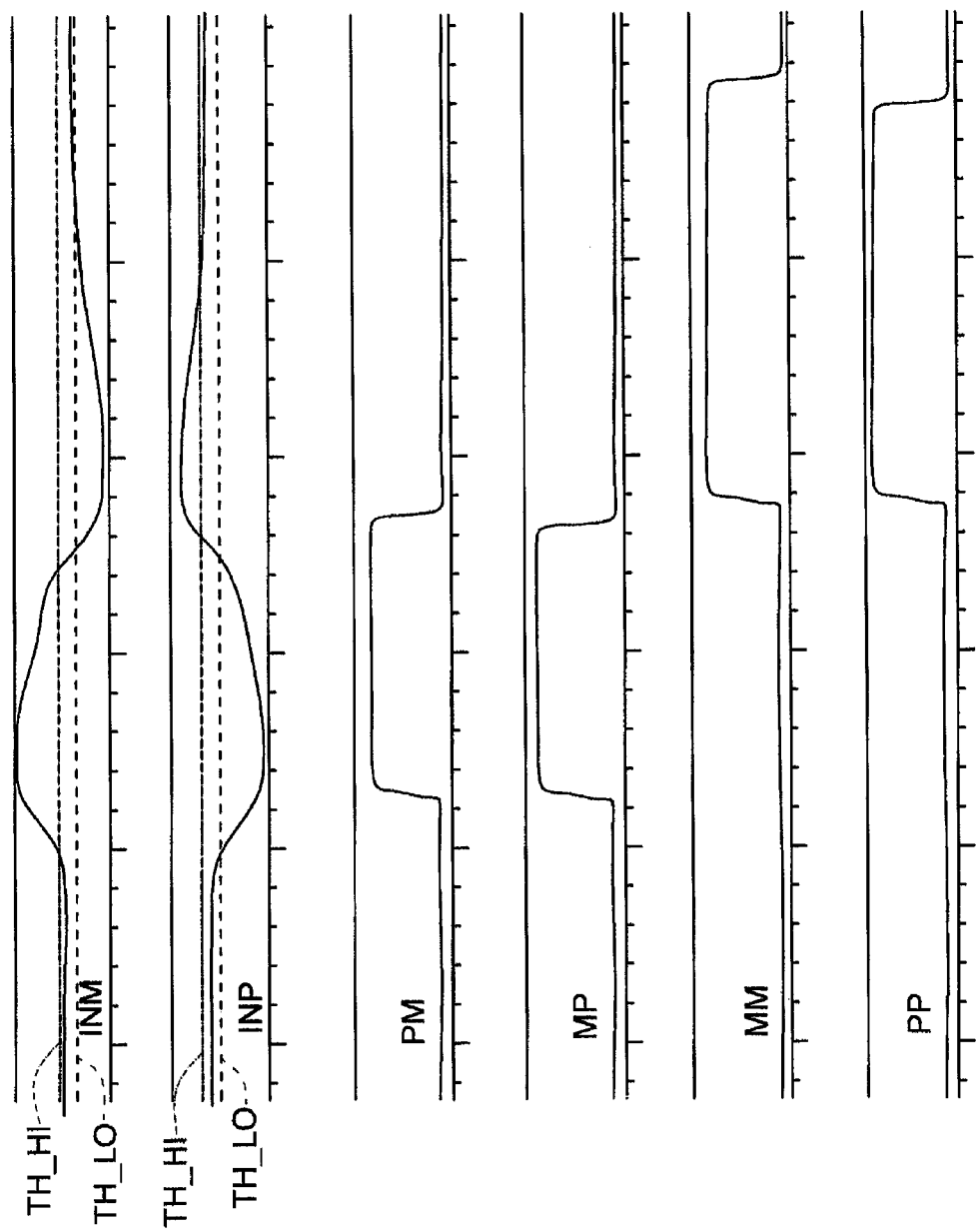
FIG. 14 shows the time diagrams of the signals involved in an embodiment of the comparator block of the discriminator in FIG. 11 in the absence of disturbances.
Figure 15:
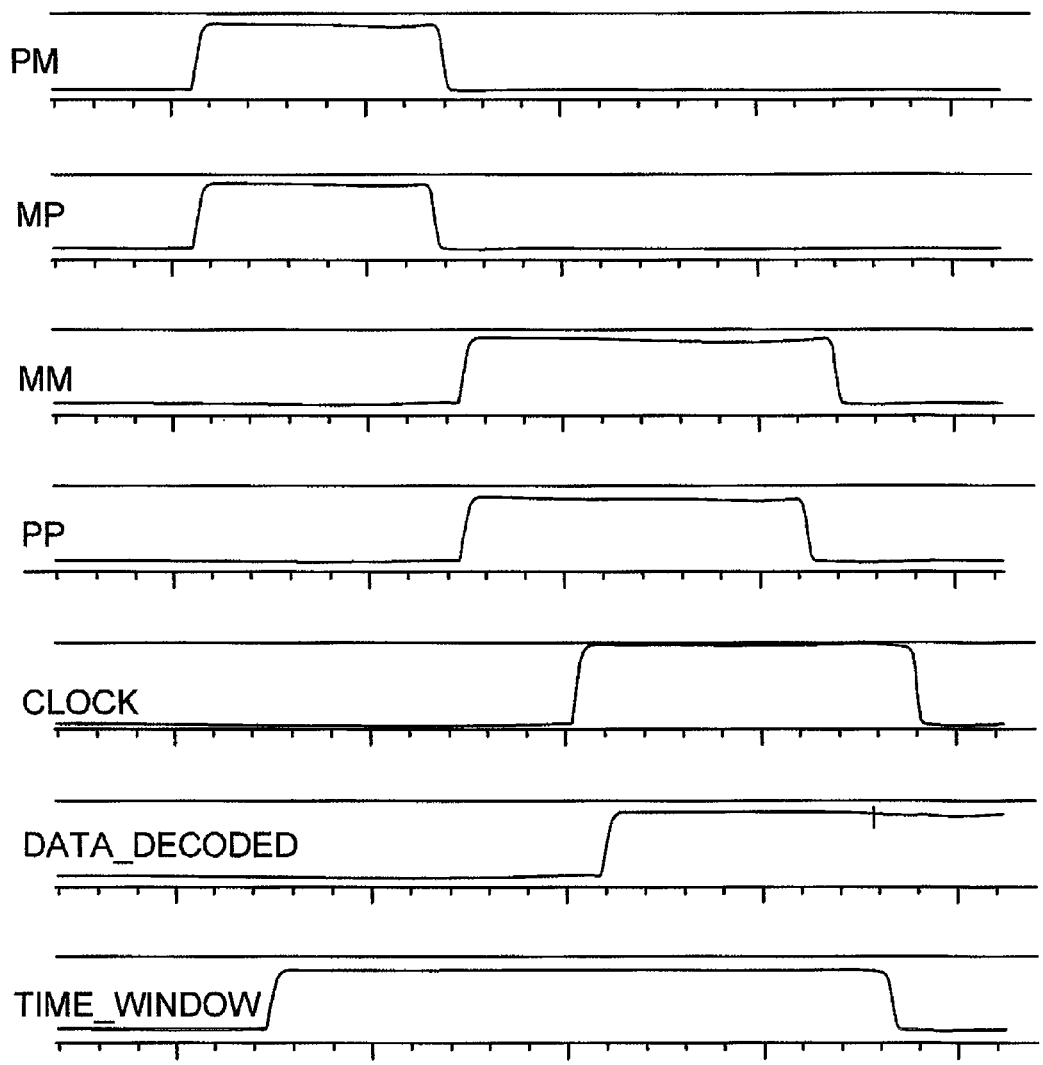
FIG. 15 shows the time diagrams of the signals involved in an embodiment of the discriminator in FIG. 11 in the absence of disturbances.

Therefore, the discriminator 7 may have three filtering levels of disturbances: a hysteresis between the detection thresholds of the pulses within which the differential noise or the common-mode noise is ignored, the need for the first couple of pulses to come according to the sequence in FIG. 14, the need for the second couple of pulses to come according to the sequence in FIG. 14.

Furthermore, the time window TIME_WINDOW may ensure that the system does not indefinitely keep on waiting for the second couple of pulses.

The same device 12 allows the data to be decoded. The device 12 comprises an AND port DATA HIGH having at the input the signals P_L and N_L_NEG and the output of which is at the input of the latch DATASET, the output Q of which is at the input of an AND port 122. The device 12 also comprises an AND port DATA_LOW having at the input the signals N_L and P_L_NEG and the output of which is at the input of the latch DATARESET, the output Q denied of which is at the input of the AND port 122. A further latch DATA_OUT has the output of the port 122 at the input D carrying the data at the output by means of the signal DATA-DECODED only if the clock signal CLOCK is present at the input, i.e., only if the clock signal CLOCK is decoded.

A receiver 4 may be implemented, comprising the input stage coupled to the turn L2 and provided with the disturbance rejection circuit 6 or the circuit comprising the circuital blocks 51, 53 and 54 and the decoder 70 of the known type for decoding the received signal, in accordance with an embodiment.

A receiver 4 may also be implemented, comprising the discriminator 7 in accordance with an embodiment and an amplifier of the known type 55 placed between the turn L2 and the input of the discriminator 7.

Figure 16:
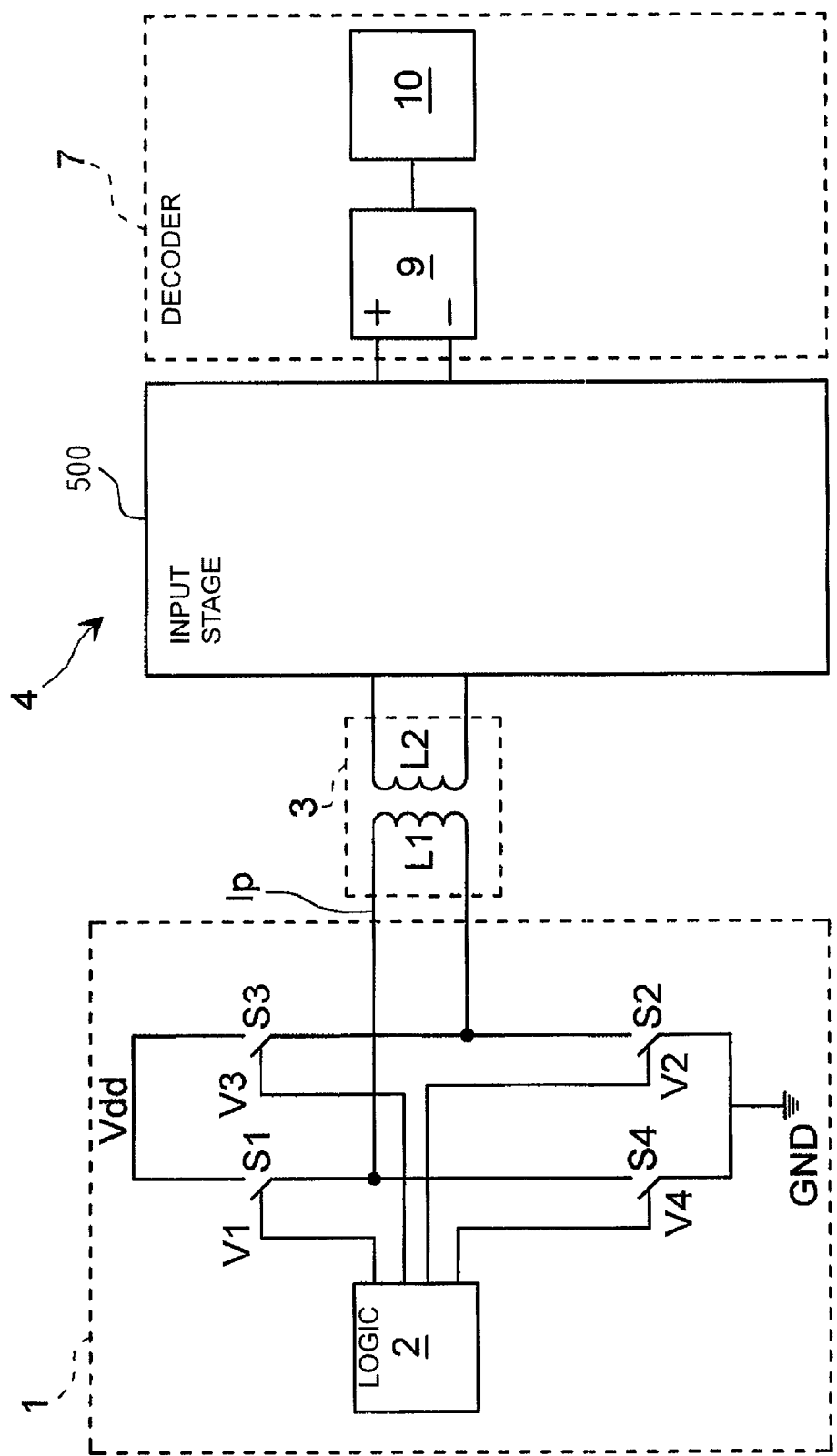
FIG. 16 shows an embodiment of the receiver for a communication system in accordance with a third embodiment.

A receiver 4 may also be implemented, in accordance with an embodiment, comprising both the input stage 500, which may comprise, for example, the input stage 5 of FIGS. 6a and 6b, or the input stage 50 of FIG. 9, coupled to the turn L2 and provided with the disturbance rejection circuit 6 or the circuit comprising the blocks 51, 53 and 54, as denoted in the first embodiment and its variations, and the discriminator 7, as denoted in the second embodiment, to obtain a more disturbance-immune receiver 4, as shown in FIG. 16.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver, comprising:
a disturbance rejection block configured to receive signals from a receiving antenna of a galvanically isolated wireless interface and to compensate for parasitic currents flowing between a transmitting antenna and the receiving antenna at potential variations between an input and an output of the galvanically isolated wireless interface, wherein the disturbance rejection block includes:
a common-mode disturbance rejection block configured to take up parasitic currents present on terminals of the receiving antenna; and
a common-mode voltage biasing block configured to bias received signals.

2. The receiver of claim 1 wherein the disturbance rejection block comprises:
a series of resistors configured to couple between the terminals of said receiving antenna; and
a common-mode voltage adjustor configured to adjust a voltage between an intermediate terminal of said resistors and a ground based on a reference voltage.

3. The receiver of claim 2 wherein the common-mode voltage adjustor comprises:
a transistor output stage configured to modify the voltage between the intermediate terminal of the resistors and the ground; and
a differential stage configured to receive said voltage between the intermediate terminal of said resistors and the ground and said reference voltage, and to drive the transistor output stage.

4. The receiver of claim 2 wherein the common-mode voltage adjustor comprises:
two transistor output stages configured to modify voltages at respective ends of the series of resistors; and
a differential stage configured to receive said voltage between the intermediate terminal of said resistors and the ground, and said reference voltage, and to drive the two transistor output stages.

5. The receiver of claim 1, further comprising:
a wideband-voltage differential amplifier configured to amplify a received signal and having a cut-off frequency substantially equal to double a band-center frequency of a received signal, said amplifier comprising at least one capacitor configured to filter a direct current component of an output of the amplifier and keep it at a value to allow polarization downstream of the amplifier.

6. The receiver of claim 1, further comprising:
an amplifier configured to amplify a received signal, said amplifier comprising a fast comparator fed back with an error amplifier adapted to reset an offset of the received signal, said error amplifier being configured to compare an output signal of the fast comparator with a reference signal and keep a direct current component of an output signal of the amplifier at a value to polarize the receiver downstream of the amplifier.

7. The receiver of claim 1, further comprising a transimpedance stage configured to coupled to terminals of the receiving antenna wherein:
the common-mode disturbance rejection block comprises a clamp configured to take up parasite currents present on the terminals of the receiving antenna; and
the common-mode voltage biasing block comprises a common-mode voltage follower configured to bias the transimpedance stage in order to balance effects of the parasite currents present on the terminals of the receiving antenna.

8. The receiver of claim 7 wherein the clamp comprises two circuit branches having a series of a PMOS transistor and an NMOS transistor coupled between a supply voltage and a ground and having a drain terminal in common, the PMOS transistors being driven by a reference voltage and gate and drain terminals of the NMOS transistors being configured to couple to the terminals of the receiving antenna.

9. The receiver of claim 8 wherein said transimpedance stage comprises two MOS transistors having gate terminals in common and source terminals configured to couple to the terminals of the receiving antenna, and the common-mode voltage follower comprises two MOS transistors having gate and drain terminals in common and source terminals configured to couple to the terminals of the receiving antenna, the gate terminals of the transistors of the common-mode voltage follower and of the transistors of the transimpedance stage being coupled together to a polarization current generator.

10. The receiver of claim 8 wherein said transimpedance stage comprises two MOS transistors having a gate terminal in common and source terminals configured to couple to the terminals of the receiving antenna, and said common-mode voltage follower comprises:
a series of resistors configured to couple to the terminals of the receiving antenna; and
a series of first and second MOS transistors each having respective gate and drain terminals coupled together, wherein a source terminal of the first MOS transistor is coupled to a ground, the first MOS transistor has a gate terminal coupled to an intermediate terminal of said series of resistors and to the source terminal of the second transistor, and a drain terminal of the second MOS transistor being coupled to gate terminals of the transistors of the transimpedance stage and to a polarization current generator.

11. The receiver of claim 1 wherein the receiver is a receiver of a transceiver, the transceiver including a transmitter and the galvanically isolated wireless interface.

12. A system, comprising:
a transmitter;
a galvanically isolated wireless interface having a first antenna coupled to the transmitter and a second antenna; and
a receiver coupled to the second antenna of the galvanically isolated wireless interface and having a disturbance rejection block configured to compensate for parasitic currents flowing between the first and second antennas at potential variations between an input and an output of the galvanically isolated wireless interface, the disturbance rejection block comprising:
a common-mode disturbance rejection block configured to take up parasitic currents present on the terminals of the second antenna; and
a common-mode voltage biasing block configured to bias received signals.

13. The system of claim 12 wherein the disturbance rejection block comprises:
a series of resistors configured to couple between the terminals of the second antenna; and
a common-mode voltage adjustor configured to adjust, based on a reference voltage, a voltage between an intermediate node of the series of resistors and a ground.

14. The system of claim 13 wherein the common-mode voltage adjustor comprises:
a transistor output stage configured to modify the voltage between the intermediate terminal of the resistors and the ground; and
a differential stage configured to receive the voltage between the intermediate terminal of the series of resistors and the ground, and the reference voltage, and to drive the transistor output stage.

15. The system of claim 13 wherein the common-mode voltage adjustor comprises:
two transistor output stages configured to modify voltages at respective ends of the series of resistors; and
a differential stage configured to receive the voltage between the intermediate terminal of the series of resistors and the ground, and the reference voltage, and to drive the two transistor output stages.

16. The system of claim 13 wherein the receiver further comprises:
a wideband-voltage differential amplifier configured to amplify a received signal and having a cut-off frequency substantially equal to double a band-center frequency of a received signal, the amplifier comprising at least one capacitor configured to filter a direct current component of an output of the amplifier and keep it at a value to allow polarization downstream of the amplifier.

17. The system of claim 12 wherein the receiver further comprises:
an amplifier configured to amplify a received signal, the amplifier comprising a fast comparator fed back with an error amplifier adapted to reset an offset of the received signal, the error amplifier being configured to compare an output signal of the fast comparator with a reference signal and keep a direct current component of an output signal of the amplifier at a value to polarize the receiver downstream of the amplifier.

18. The system of claim 12 wherein the receiver further comprises a transimpedance stage coupled to terminals of the second antenna and wherein:
the common-mode disturbance rejection block comprises a clamp configured to take up parasite currents present on the terminals of the second antenna; and
the common-mode voltage biasing block comprises a common-mode voltage follower configured to bias the transimpedance stage in order to balance effects of the parasite currents present on the terminals of the second antenna.

19. The system of claim 18 wherein the clamp comprises two circuit branches having a series of a PMOS transistor and an NMOS transistor coupled between a supply voltage and a ground and having a drain terminal in common, the PMOS transistors being driven by the reference voltage and the NMOS transistors having gate and drain terminals coupled to the terminals of the second antenna.

20. The system of claim 19 wherein the transimpedance stage comprises two MOS transistors having gate terminals in common and source terminals coupled to the terminals of the second antenna, and the common-mode voltage follower comprises two MOS transistors having gate and drain terminals in common and source terminals coupled to the terminals of the second antenna, the gate terminals of the transistors of the common-mode voltage follower and of the transistors of the transimpedance stage being coupled together to a polarization current generator.

21. The system of claim 19 wherein the transimpedance stage comprises two MOS transistors having a gate terminal in common and source terminals coupled to the terminals of the second antenna, and the common-mode voltage follower comprises:
a series of resistors coupled to the terminals of the second antenna; and
a series of first and second MOS transistors each having respective gate and drain terminals coupled together, wherein a source terminal of the first MOS transistor is coupled to a ground, the first MOS transistor has a gate terminal coupled to an intermediate terminal of said series of resistors and to the source terminal of the second transistor, and a drain terminal of the second MOS transistor being coupled to gate terminals of the transistors of the transimpedance stage and to a polarization current generator.

22. A receiver, comprising:
means for amplifying signals received through a galvanically isolated wireless interface; and
means for compensating for parasitic currents flowing between a transmitting antenna and a receiving antenna at potential variations between an input and an output of the galvanically isolated wireless interface, the means for compensating including:
means for taking up parasitic currents present on terminals of the receiving antenna; and
means for biasing the means for amplifying.

23. The receiver of claim 22 wherein the means for compensating comprises:
a series of resistors configured to couple between terminals of a receiving antenna of the wireless interface; and
means for adjusting a voltage between an intermediate terminal of said series of resistors and a ground based on a reference voltage.

24. The receiver of claim 23 wherein the means for adjusting comprises:
a transistor output stage configured to modify the voltage between the intermediate terminal of the series of resistors and the ground; and
a differential stage configured to receive said voltage between the intermediate terminal of said series of resistors and the ground and said reference voltage, and to drive the transistor output stage.

25. The receiver of claim 23 wherein the means for adjusting comprises:
means for modifying voltages at respective ends of the series of resistors; and
means for driving the means for modifying based on the voltage between the intermediate terminal of the resistors and the ground, and the reference voltage.

26. The receiver of claim 22 wherein the means for amplifying comprises:
a wideband-voltage differential amplifier configured to amplify a received signal and having a cut-off frequency substantially equal to double a band-center frequency of a received signal, said amplifier having means for filtering a direct current component of an output of the amplifier and maintaining polarization.

27. The receiver of claim 22 wherein the means for amplifying comprises means for maintaining polarization of received signals.

28. The receiver of claim 27 wherein the means for maintaining polarization comprises a fast comparator fed back with an error amplifier adapted to reset an offset of a received signal, said error amplifier being configured to compare an output signal of the fast comparator with a further reference signal and keep a direct current component of an output signal of the amplifier at a value to polarize the receiver downstream of the amplifier.

29. The receiver of claim 22, comprising means for converting a current signal to a voltage signal, wherein:
the means for taking up parasitic currents comprises means for clamping the terminals of the antenna; and
the means for biasing comprises means for modifying a polarization of the means for amplifying.

30. The receiver of claim 22, further comprising means for decoding received signals.

31. A method, comprising:
receiving a signal through a galvanically isolated wireless interface having first and second antennas;
rejecting common-mode transients of the received signal at potential variations between an input and an output of the galvanically isolated wireless interface by:
taking up parasitic currents present on terminals of the second antenna;
biasing the received signal; and
amplifying the received biased signal.

32. The method of claim 31, further comprising decoding the amplified signal.

33. The method of claim 31 wherein the biasing comprises:
adjusting, based on a reference voltage, a voltage at an intermediate node of a series of resistors coupled between terminals of the second antenna of the wireless interface.

34. The method of claim 33 wherein the adjusting comprises:
modifying voltages at respective ends of the series of resistors.

35. The method of claim 31 wherein the amplifying comprises:
filtering a direct current of the amplified signal while maintaining polarization.

36. A receiver, comprising:
a disturbance rejection block configured to receive signals from a receiving antenna of a galvanically isolated wireless interface and to compensate for parasitic currents flowing between a transmitting antenna and the receiving antenna at potential variations between an input and an output of the galvanically isolated wireless interface, wherein the disturbance rejection block includes:
a series of resistors configured to couple between terminals of the receiving antenna;
a transistor output stage configured to modify a voltage between an intermediate terminal of the resistors and a ground; and
a differential stage configured to receive the voltage between the intermediate terminal of the resistors and the ground and a reference voltage, and to drive the transistor output stage.

37. The receiver of claim 36, further comprising:
a wideband-voltage differential amplifier configured to amplify a received signal and having a cut-off frequency substantially equal to double a band-center frequency of a received signal, said amplifier comprising at least one capacitor configured to filter a direct current component of an output of the amplifier and keep it at a value to allow polarization downstream of the amplifier.

38. A receiver, comprising:
a disturbance rejection block configured to receive signals from a receiving antenna of a galvanically isolated wireless interface and to compensate for parasitic currents flowing between a transmitting antenna and the receiving antenna at potential variations between an input and an output of the galvanically isolated wireless interface, wherein the disturbance rejection block includes:
a series of resistors configured to couple between terminals of the receiving antenna;
two transistor output stages configured to modify voltages at respective ends of the series of resistors; and
a differential stage configured to receive a voltage between an intermediate terminal of said resistors and a ground, and said reference voltage, and to drive the two transistor output stages.

39. The receiver of claim 38 wherein the disturbance rejection block further comprises a clamp configured to take up parasitic currents present on the terminals of the receiving antenna.

* * * * *